United States Patent
Kim et al.

(10) Patent No.: US 11,259,046 B2
(45) Date of Patent: Feb. 22, 2022

(54) PROCESSING OF EQUIRECTANGULAR OBJECT DATA TO COMPENSATE FOR DISTORTION BY SPHERICAL PROJECTIONS

(71) Applicant: Apple Inc., Cupertino, CA (US)

(72) Inventors: Jae Hoon Kim, San Jose, CA (US);
Chris Y. Chung, Sunnyvale, CA (US);
Dazhong Zhang, Milpitas, CA (US);
Hang Yuan, San Jose, CA (US);
Hsi-Jung Wu, San Jose, CA (US);
Jiefu Zhai, San Jose, CA (US);
Xiaosong Zhou, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/433,505

(22) Filed: Feb. 15, 2017

(65) Prior Publication Data

US 2018/0234700 A1 Aug. 16, 2018

(51) Int. Cl.
*H04N 19/597* (2014.01)
*H04N 19/61* (2014.01)
(Continued)

(52) U.S. Cl.
CPC ......... *H04N 19/597* (2014.11); *H04N 19/105* (2014.11); *H04N 19/124* (2014.11);
(Continued)

(58) Field of Classification Search
CPC .... H04N 19/597; H04N 19/139; H04N 19/51; H04N 19/176; H04N 19/13;
(Continued)

(56) References Cited

U.S. PATENT DOCUMENTS

| 4,890,257 A | 12/1989 | Anthias et al. |
| 5,185,667 A | 2/1993 | Zimmerman |

(Continued)

FOREIGN PATENT DOCUMENTS

| EP | 2077525 A1 | 7/2009 |
| JP | 2005-159824 A | 6/2005 |

(Continued)

OTHER PUBLICATIONS

Tosic et al.; "Multiresolution Motion Estimation for Omnidirectional Images"; IEEE 13$^{th}$ European Signal Processing Conference; Sep. 2005; 4 pages.

(Continued)

*Primary Examiner* — Richard T Torrente
(74) *Attorney, Agent, or Firm* — BakerHostetler

(57) ABSTRACT

Methods and Systems disclosed to counteract spatial distortions introduced by imaging processes of multi-directional video frames, where objects may be projected to spherical or equirectangular representations. Techniques provided to invert the spatial distortions in video frames used as reference picture data in predictive coding, by spatially transforming the image content of the reference picture data before this image content is being used for the prediction of input video data in prediction-based coders and decoders.

32 Claims, 10 Drawing Sheets

(51) Int. Cl.
*H04N 19/105* (2014.01)
*H04N 19/513* (2014.01)
*H04N 19/159* (2014.01)
*H04N 19/124* (2014.01)
*H04N 19/13* (2014.01)
*H04N 19/176* (2014.01)
*H04N 19/51* (2014.01)
*H04N 19/139* (2014.01)
*H04N 19/182* (2014.01)
*H04N 19/547* (2014.01)
*H04N 19/527* (2014.01)

(52) U.S. Cl.
CPC .......... *H04N 19/13* (2014.11); *H04N 19/139* (2014.11); *H04N 19/159* (2014.11); *H04N 19/176* (2014.11); *H04N 19/51* (2014.11); *H04N 19/513* (2014.11); *H04N 19/61* (2014.11); *H04N 19/182* (2014.11); *H04N 19/527* (2014.11); *H04N 19/547* (2014.11)

(58) Field of Classification Search
CPC .. H04N 19/124; H04N 19/105; H04N 19/513; H04N 19/61; H04N 19/159; H04N 19/547; H04N 19/527; H04N 19/182
USPC .................................................... 375/240.16
See application file for complete search history.

(56) References Cited

U.S. PATENT DOCUMENTS

| | | |
|---|---|---|
| 5,262,777 A | 11/1993 | Low et al. |
| 5,313,306 A | 5/1994 | Kuban et al. |
| 5,359,363 A | 10/1994 | Kuban et al. |
| 5,448,687 A | 9/1995 | Hoogerhyde et al. |
| 5,537,155 A | 7/1996 | O'Connell et al. |
| 5,600,346 A | 2/1997 | Kamata et al. |
| 5,684,937 A | 11/1997 | Oxaal |
| 5,689,800 A | 11/1997 | Downs |
| 5,715,016 A | 2/1998 | Kobayashi et al. |
| 5,787,207 A | 7/1998 | Golin |
| 5,872,604 A | 2/1999 | Ogura |
| 5,903,270 A | 5/1999 | Gentry et al. |
| 5,936,630 A | 8/1999 | Oxaal |
| 6,011,897 A | 1/2000 | Koyama et al. |
| 6,031,540 A | 2/2000 | Golin et al. |
| 6,043,837 A | 3/2000 | Driscoll, Jr. et al. |
| 6,058,212 A | 5/2000 | Yokoyama |
| 6,122,317 A | 9/2000 | Hanami et al. |
| 6,144,890 A | 11/2000 | Rothkop |
| 6,204,854 B1 | 3/2001 | Signes et al. |
| 6,219,089 B1 | 4/2001 | Driscoll, Jr. et al. |
| 6,222,883 B1 | 4/2001 | Murdock et al. |
| 6,317,159 B1 | 11/2001 | Aoyama |
| 6,331,869 B1 | 12/2001 | Furlan et al. |
| 6,426,774 B1 | 7/2002 | Driscoll, Jr. et al. |
| 6,535,643 B1 | 3/2003 | Hong |
| 6,539,060 B1 | 3/2003 | Lee et al. |
| 6,559,853 B1 | 5/2003 | Hashimoto et al. |
| 6,577,335 B2 | 6/2003 | Kobayashi et al. |
| 6,751,347 B2 | 6/2004 | Pettigrew et al. |
| 6,762,789 B1 | 7/2004 | Sogabe et al. |
| 6,769,131 B1 | 7/2004 | Tanaka et al. |
| 6,795,113 B1 | 9/2004 | Jackson et al. |
| 6,907,310 B2 | 6/2005 | Gardner et al. |
| 6,973,130 B1 | 12/2005 | Wee et al. |
| 6,993,201 B1 | 1/2006 | Haskell et al. |
| 7,006,707 B2 | 2/2006 | Peterson |
| 7,015,954 B1 | 3/2006 | Foote et al. |
| 7,039,113 B2 | 5/2006 | Soundararajan |
| 7,050,085 B1 | 5/2006 | Park et al. |
| 7,095,905 B1 | 8/2006 | Peterson |
| 7,123,777 B2 | 10/2006 | Rondinelli et al. |
| 7,139,440 B2 | 11/2006 | Rondinelli et al. |
| 7,149,549 B1 | 12/2006 | Ortiz et al. |
| 7,259,760 B1 | 8/2007 | Hashimoto et al. |
| 7,327,787 B1 | 2/2008 | Chen et al. |
| 7,382,399 B1 | 6/2008 | McCall et al. |
| 7,385,995 B2 | 6/2008 | Stiscia et al. |
| 7,415,356 B1 | 8/2008 | Gowda et al. |
| 7,433,535 B2 | 10/2008 | Mukherjee et al. |
| 7,450,749 B2 | 11/2008 | Rouet et al. |
| 7,593,041 B2 | 9/2009 | Novak et al. |
| 7,620,261 B2 | 11/2009 | Chiang et al. |
| 7,660,245 B1 | 2/2010 | Luby |
| 7,742,073 B1 | 6/2010 | Cohen-Solal et al. |
| 7,755,667 B2 | 7/2010 | Rabbani et al. |
| 7,782,357 B2 | 8/2010 | Cutler |
| 8,027,473 B2 | 9/2011 | Stiscia et al. |
| 8,045,615 B2 | 10/2011 | Liang et al. |
| 8,217,956 B1 | 7/2012 | Jin |
| 8,255,552 B2 | 8/2012 | Witt et al. |
| 8,270,496 B2 | 9/2012 | Yin et al. |
| 8,295,360 B1 | 10/2012 | Lewis et al. |
| 8,339,394 B1 | 12/2012 | Lininger |
| 8,442,109 B2 | 5/2013 | Wang et al. |
| 8,442,311 B1 | 5/2013 | Hobbs et al. |
| 8,462,109 B2 | 6/2013 | Nasiri et al. |
| 8,462,853 B2 | 6/2013 | Jeon et al. |
| 8,482,595 B2 | 7/2013 | Kweon |
| 8,682,091 B2 | 3/2014 | Amit et al. |
| 8,693,537 B2 | 4/2014 | Wang et al. |
| 8,711,941 B2 | 4/2014 | Letunovskiy et al. |
| 9,013,536 B2 | 4/2015 | Zhu et al. |
| 9,071,484 B1 | 6/2015 | Traux |
| 9,094,681 B1 | 7/2015 | Wilkins et al. |
| 9,098,870 B2 | 8/2015 | Meadow et al. |
| 9,219,919 B2 | 12/2015 | Deshpande |
| 9,224,247 B2 | 12/2015 | Wada et al. |
| 9,258,520 B2 | 2/2016 | Lee |
| 9,277,122 B1 | 3/2016 | Imura et al. |
| 9,404,764 B2 | 8/2016 | Lynch |
| 9,430,873 B2 | 8/2016 | Nakamura et al. |
| 9,510,007 B2 | 11/2016 | Chan et al. |
| 9,516,225 B2 | 12/2016 | Banta et al. |
| 9,596,899 B2 | 3/2017 | Stahl et al. |
| 9,639,935 B1 | 5/2017 | Douady-Pleven et al. |
| 9,723,223 B1 | 8/2017 | Banta et al. |
| 9,743,060 B1 | 8/2017 | Matias et al. |
| 9,754,413 B1 | 9/2017 | Gray |
| 9,781,356 B1 | 10/2017 | Banta et al. |
| 9,823,835 B2 | 11/2017 | Wang et al. |
| 9,838,687 B1 | 12/2017 | Banta et al. |
| 9,866,815 B2 | 1/2018 | Vrcelj et al. |
| 9,936,204 B1 | 4/2018 | Sim et al. |
| 9,967,563 B2 | 5/2018 | Hsu et al. |
| 9,967,577 B2 | 5/2018 | Wu et al. |
| 9,992,502 B2 | 6/2018 | Abbas et al. |
| 9,996,945 B1 | 6/2018 | Holzer et al. |
| 10,102,611 B1 | 10/2018 | Murtha et al. |
| 10,204,658 B2 | 2/2019 | Krishnan |
| 10,212,456 B2 | 2/2019 | Guo et al. |
| 10,264,282 B2 | 4/2019 | Huang et al. |
| 10,277,897 B1 | 4/2019 | Mukherjee et al. |
| 10,282,814 B2 | 5/2019 | Lin et al. |
| 10,306,186 B2 | 5/2019 | Chuang et al. |
| 10,321,109 B1 | 6/2019 | Tanumihardja et al. |
| 10,334,222 B2 | 6/2019 | Kokare et al. |
| 10,339,627 B2 | 7/2019 | Abbas et al. |
| 10,339,688 B2 | 7/2019 | Su et al. |
| 10,349,068 B1 | 7/2019 | Banta et al. |
| 10,375,371 B2 | 8/2019 | Xu et al. |
| 10,455,238 B2 | 10/2019 | Mody et al. |
| 10,523,913 B2 | 12/2019 | Kim et al. |
| 10,559,121 B1 | 2/2020 | Moudgil et al. |
| 10,573,060 B1 | 2/2020 | Ascolese et al. |
| 10,574,997 B2 | 2/2020 | Chung et al. |
| 10,593,012 B2 | 3/2020 | Lee et al. |
| 10,614,609 B2 | 4/2020 | Shih et al. |
| 10,642,041 B2 | 5/2020 | Han et al. |
| 10,643,370 B2 | 5/2020 | Lin et al. |
| 10,652,284 B2 | 5/2020 | Liu et al. |
| 10,728,546 B2 | 7/2020 | Leontaris et al. |

(56) References Cited

U.S. PATENT DOCUMENTS

| | | |
|---|---|---|
| 2001/0006376 A1 | 7/2001 | Numa |
| 2001/0028735 A1 | 10/2001 | Pettigrew et al. |
| 2001/0036303 A1 | 11/2001 | Maurincomme et al. |
| 2002/0080878 A1 | 6/2002 | Li |
| 2002/0093670 A1 | 7/2002 | Luo et al. |
| 2002/0126129 A1 | 9/2002 | Snyder et al. |
| 2002/0140702 A1 | 10/2002 | Koller et al. |
| 2002/0141498 A1 | 10/2002 | Martins |
| 2002/0190980 A1 | 12/2002 | Gerritsen et al. |
| 2002/0196330 A1 | 12/2002 | Park et al. |
| 2003/0098868 A1 | 5/2003 | Fujiwara et al. |
| 2003/0099294 A1 | 5/2003 | Wang et al. |
| 2003/0152146 A1 | 8/2003 | Lin et al. |
| 2004/0022322 A1 | 2/2004 | Dye |
| 2004/0028133 A1 | 2/2004 | Subramaniyan et al. |
| 2004/0028134 A1 | 2/2004 | Subramaniyan et al. |
| 2004/0032906 A1 | 2/2004 | Lillig et al. |
| 2004/0056900 A1 | 3/2004 | Blume |
| 2004/0189675 A1 | 9/2004 | Pretlove et al. |
| 2004/0201608 A1 | 10/2004 | Ma et al. |
| 2004/0218099 A1 | 11/2004 | Washington |
| 2004/0227766 A1 | 11/2004 | Chou et al. |
| 2004/0247173 A1 | 12/2004 | Nielsen et al. |
| 2005/0013498 A1 | 1/2005 | Srinivasan et al. |
| 2005/0041023 A1 | 2/2005 | Green |
| 2005/0069682 A1 | 3/2005 | Tseng |
| 2005/0129124 A1 | 6/2005 | Ha |
| 2005/0204113 A1 | 9/2005 | Harper et al. |
| 2005/0232356 A1* | 10/2005 | Gomi ............... H04N 19/51 375/240.16 |
| 2005/0243915 A1 | 11/2005 | Kwon et al. |
| 2005/0244063 A1 | 11/2005 | Kwon et al. |
| 2005/0286777 A1* | 12/2005 | Kumar ............... H04N 19/119 382/232 |
| 2006/0034527 A1 | 2/2006 | Gritsevich |
| 2006/0055699 A1 | 3/2006 | Perlman et al. |
| 2006/0055706 A1 | 3/2006 | Perlman et al. |
| 2006/0110062 A1 | 5/2006 | Chiang et al. |
| 2006/0119599 A1 | 6/2006 | Woodbury |
| 2006/0126719 A1 | 6/2006 | Wilensky |
| 2006/0132482 A1 | 6/2006 | Oh |
| 2006/0165164 A1 | 7/2006 | Kwan et al. |
| 2006/0165181 A1 | 7/2006 | Kwan et al. |
| 2006/0204043 A1 | 9/2006 | Takei |
| 2006/0238445 A1 | 10/2006 | Wang et al. |
| 2006/0282855 A1 | 12/2006 | Margulis |
| 2007/0024705 A1 | 2/2007 | Richter et al. |
| 2007/0057943 A1 | 3/2007 | Beda et al. |
| 2007/0064120 A1 | 3/2007 | Didow et al. |
| 2007/0071100 A1 | 3/2007 | Shi et al. |
| 2007/0097268 A1 | 5/2007 | Relan et al. |
| 2007/0115841 A1 | 5/2007 | Taubman et al. |
| 2007/0223582 A1 | 9/2007 | Borer |
| 2007/0263722 A1 | 11/2007 | Fukuzawa |
| 2007/0291143 A1 | 12/2007 | Barbieri et al. |
| 2008/0036875 A1 | 2/2008 | Jones et al. |
| 2008/0044104 A1 | 2/2008 | Gering |
| 2008/0049991 A1 | 2/2008 | Gering |
| 2008/0077953 A1 | 3/2008 | Fernandez et al. |
| 2008/0118180 A1 | 5/2008 | Kamiya et al. |
| 2008/0184128 A1 | 7/2008 | Swenson et al. |
| 2008/0252717 A1 | 10/2008 | Moon et al. |
| 2008/0310513 A1 | 12/2008 | Ma et al. |
| 2009/0040224 A1 | 2/2009 | Igarashi et al. |
| 2009/0123088 A1 | 5/2009 | Kallay et al. |
| 2009/0153577 A1 | 6/2009 | Ghyme et al. |
| 2009/0190858 A1 | 7/2009 | Moody et al. |
| 2009/0219280 A1 | 9/2009 | Maillot |
| 2009/0219281 A1 | 9/2009 | Maillot |
| 2009/0251530 A1 | 10/2009 | Cilia et al. |
| 2009/0262838 A1 | 10/2009 | Gholmieh et al. |
| 2010/0029339 A1 | 2/2010 | Kim et al. |
| 2010/0061451 A1 | 3/2010 | Fuchigami |
| 2010/0079605 A1 | 4/2010 | Wang et al. |
| 2010/0080287 A1 | 4/2010 | Ali |
| 2010/0110481 A1 | 5/2010 | Do et al. |
| 2010/0124274 A1 | 5/2010 | Cheok et al. |
| 2010/0135389 A1 | 6/2010 | Tanizawa et al. |
| 2010/0215226 A1 | 8/2010 | Kaufman et al. |
| 2010/0305909 A1 | 12/2010 | Wolper et al. |
| 2010/0316129 A1 | 12/2010 | Zhao et al. |
| 2010/0329361 A1 | 12/2010 | Choi et al. |
| 2010/0329362 A1 | 12/2010 | Choi et al. |
| 2011/0058055 A1 | 3/2011 | Lindahl et al. |
| 2011/0090967 A1 | 4/2011 | Chen et al. |
| 2011/0128350 A1 | 6/2011 | Oliver et al. |
| 2011/0142306 A1 | 6/2011 | Nair |
| 2011/0194617 A1 | 8/2011 | Kumar et al. |
| 2011/0200100 A1 | 8/2011 | Kim et al. |
| 2011/0235706 A1 | 9/2011 | Demircin et al. |
| 2011/0274158 A1 | 11/2011 | Fu et al. |
| 2011/0305274 A1 | 12/2011 | Fu et al. |
| 2011/0310089 A1 | 12/2011 | Petersen |
| 2012/0082232 A1 | 4/2012 | Rojals et al. |
| 2012/0098926 A1 | 4/2012 | Kweon |
| 2012/0192115 A1 | 7/2012 | Falchuk et al. |
| 2012/0219055 A1 | 8/2012 | He et al. |
| 2012/0230392 A1 | 9/2012 | Zheng et al. |
| 2012/0260217 A1 | 10/2012 | Celebisoy |
| 2012/0263231 A1 | 10/2012 | Zhou |
| 2012/0307746 A1 | 12/2012 | Hammerschmidt et al. |
| 2012/0320169 A1 | 12/2012 | Bathiche |
| 2012/0320984 A1 | 12/2012 | Zhou |
| 2012/0327172 A1 | 12/2012 | Ei-Saban et al. |
| 2013/0003858 A1 | 1/2013 | Sze |
| 2013/0016783 A1 | 1/2013 | Kim et al. |
| 2013/0044108 A1 | 2/2013 | Tanaka et al. |
| 2013/0051452 A1 | 2/2013 | Li et al. |
| 2013/0051467 A1 | 2/2013 | Zhou et al. |
| 2013/0088491 A1 | 4/2013 | Hobbs et al. |
| 2013/0094568 A1 | 4/2013 | Hsu et al. |
| 2013/0101025 A1 | 4/2013 | Van fer Auwera et al. |
| 2013/0101042 A1 | 4/2013 | Sugio et al. |
| 2013/0111399 A1 | 5/2013 | Rose |
| 2013/0124156 A1 | 5/2013 | Wolper et al. |
| 2013/0127844 A1 | 5/2013 | Koeppel et al. |
| 2013/0128986 A1 | 5/2013 | Tsai et al. |
| 2013/0136174 A1 | 5/2013 | Xu et al. |
| 2013/0170726 A1 | 7/2013 | Kaufman et al. |
| 2013/0182775 A1 | 7/2013 | Wang et al. |
| 2013/0195183 A1 | 8/2013 | Zhai et al. |
| 2013/0208787 A1 | 8/2013 | Zheng et al. |
| 2013/0219012 A1 | 8/2013 | Suresh et al. |
| 2013/0251028 A1 | 9/2013 | Au et al. |
| 2013/0272415 A1 | 10/2013 | Zhou |
| 2013/0301706 A1 | 11/2013 | Qiu et al. |
| 2014/0002439 A1 | 1/2014 | Lynch |
| 2014/0003450 A1 | 1/2014 | Bentley et al. |
| 2014/0010293 A1 | 1/2014 | Srinivasan et al. |
| 2014/0078263 A1 | 3/2014 | Kim |
| 2014/0082054 A1 | 3/2014 | Denoual et al. |
| 2014/0089326 A1 | 3/2014 | Lin et al. |
| 2014/0140401 A1 | 5/2014 | Lee et al. |
| 2014/0153636 A1 | 6/2014 | Esenlik et al. |
| 2014/0169469 A1 | 6/2014 | Bernal et al. |
| 2014/0176542 A1 | 6/2014 | Shohara et al. |
| 2014/0218356 A1 | 8/2014 | Distler et al. |
| 2014/0254949 A1 | 9/2014 | Chou |
| 2014/0267235 A1 | 9/2014 | DeJohn et al. |
| 2014/0269899 A1 | 9/2014 | Park et al. |
| 2014/0286410 A1 | 9/2014 | Zenkich |
| 2014/0355667 A1 | 12/2014 | Lei et al. |
| 2014/0368669 A1 | 12/2014 | Talvala et al. |
| 2014/0376634 A1 | 12/2014 | Guo et al. |
| 2015/0003525 A1 | 1/2015 | Sasai et al. |
| 2015/0003725 A1 | 1/2015 | Wan |
| 2015/0016522 A1 | 1/2015 | Sato |
| 2015/0029294 A1 | 1/2015 | Lin et al. |
| 2015/0062292 A1 | 3/2015 | Kweon |
| 2015/0089348 A1 | 3/2015 | Jose |
| 2015/0103884 A1 | 4/2015 | Ramasubramonian et al. |
| 2015/0145966 A1 | 5/2015 | Krieger et al. |
| 2015/0195491 A1 | 7/2015 | Shaburov et al. |
| 2015/0195559 A1 | 7/2015 | Chen et al. |

(56) References Cited

U.S. PATENT DOCUMENTS

| | | |
|---|---|---|
| 2015/0195573 A1 | 7/2015 | Aflaki et al. |
| 2015/0215631 A1 | 7/2015 | Zhou et al. |
| 2015/0237370 A1 | 8/2015 | Zhou et al. |
| 2015/0256839 A1 | 9/2015 | Ueki et al. |
| 2015/0264259 A1 | 9/2015 | Raghoebardajal et al. |
| 2015/0264386 A1 | 9/2015 | Pang et al. |
| 2015/0264404 A1 | 9/2015 | Hannuksela |
| 2015/0271517 A1 | 9/2015 | Pang et al. |
| 2015/0279087 A1 | 10/2015 | Myers et al. |
| 2015/0279121 A1 | 10/2015 | Myers et al. |
| 2015/0304665 A1 | 10/2015 | Hannuksela et al. |
| 2015/0321103 A1 | 11/2015 | Barnett et al. |
| 2015/0326865 A1 | 11/2015 | Yin et al. |
| 2015/0339853 A1 | 11/2015 | Wolper et al. |
| 2015/0341552 A1 | 11/2015 | Chen et al. |
| 2015/0346812 A1* | 12/2015 | Cole .................... G06F 3/017 345/156 |
| 2015/0346832 A1 | 12/2015 | Cole et al. |
| 2015/0350673 A1 | 12/2015 | Hu et al. |
| 2015/0351477 A1 | 12/2015 | Stahl et al. |
| 2015/0358612 A1 | 12/2015 | Sandrew et al. |
| 2015/0358613 A1 | 12/2015 | Sandrew et al. |
| 2015/0358633 A1 | 12/2015 | Choi et al. |
| 2015/0373334 A1 | 12/2015 | Rapaka et al. |
| 2015/0373372 A1 | 12/2015 | He et al. |
| 2016/0012855 A1 | 1/2016 | Krishnan |
| 2016/0014422 A1 | 1/2016 | Su et al. |
| 2016/0027187 A1 | 1/2016 | Wang et al. |
| 2016/0050369 A1 | 2/2016 | Takenaka et al. |
| 2016/0080753 A1 | 3/2016 | Oh |
| 2016/0112489 A1 | 4/2016 | Adams et al. |
| 2016/0112704 A1 | 4/2016 | Grange et al. |
| 2016/0112713 A1 | 4/2016 | Russell |
| 2016/0142697 A1* | 5/2016 | Budagavi ............ H04N 13/156 348/43 |
| 2016/0150231 A1 | 5/2016 | Schulze |
| 2016/0165257 A1 | 6/2016 | Chen et al. |
| 2016/0227214 A1 | 8/2016 | Rapaka et al. |
| 2016/0234438 A1 | 8/2016 | Satoh |
| 2016/0241836 A1 | 8/2016 | Cole et al. |
| 2016/0269632 A1 | 9/2016 | Morioka |
| 2016/0277746 A1 | 9/2016 | Fu et al. |
| 2016/0286119 A1 | 9/2016 | Rondinelli |
| 2016/0350585 A1 | 12/2016 | Lin et al. |
| 2016/0350592 A1 | 12/2016 | Ma et al. |
| 2016/0352791 A1 | 12/2016 | Adams et al. |
| 2016/0352971 A1 | 12/2016 | Adams et al. |
| 2016/0353089 A1 | 12/2016 | Gallup et al. |
| 2016/0353146 A1 | 12/2016 | Weaver et al. |
| 2016/0360104 A1 | 12/2016 | Zhang et al. |
| 2016/0360180 A1 | 12/2016 | Cole et al. |
| 2017/0013279 A1* | 1/2017 | Puri .................... H04N 19/527 |
| 2017/0026659 A1 | 1/2017 | Lin et al. |
| 2017/0038942 A1 | 2/2017 | Rosenfeld et al. |
| 2017/0054907 A1 | 2/2017 | Nishihara et al. |
| 2017/0064199 A1 | 3/2017 | Lee et al. |
| 2017/0078447 A1 | 3/2017 | Hancock et al. |
| 2017/0085892 A1 | 3/2017 | Liu et al. |
| 2017/0094184 A1 | 3/2017 | Gao et al. |
| 2017/0104927 A1 | 4/2017 | Mugavero et al. |
| 2017/0109930 A1 | 4/2017 | Holzer et al. |
| 2017/0127008 A1 | 5/2017 | Kankaanpaa et al. |
| 2017/0142371 A1 | 5/2017 | Barzuza et al. |
| 2017/0155912 A1 | 6/2017 | Thomas et al. |
| 2017/0180635 A1 | 6/2017 | Hayashi et al. |
| 2017/0200255 A1 | 7/2017 | Lin et al. |
| 2017/0200315 A1 | 7/2017 | Lockhart |
| 2017/0208346 A1 | 7/2017 | Narroschke et al. |
| 2017/0214937 A1* | 7/2017 | Lin .................... H04N 19/563 |
| 2017/0223268 A1 | 8/2017 | Shimmoto |
| 2017/0223368 A1 | 8/2017 | Abbas et al. |
| 2017/0228867 A1 | 8/2017 | Baruch |
| 2017/0230668 A1* | 8/2017 | Lin .................... H04N 19/563 |
| 2017/0236323 A1 | 8/2017 | Lim et al. |
| 2017/0244775 A1 | 8/2017 | Ha et al. |
| 2017/0251208 A1 | 8/2017 | Adsumilli et al. |
| 2017/0257644 A1 | 9/2017 | Andersson et al. |
| 2017/0272698 A1 | 9/2017 | Liu et al. |
| 2017/0272758 A1 | 9/2017 | Lin et al. |
| 2017/0278262 A1 | 9/2017 | Kawamoto et al. |
| 2017/0280126 A1* | 9/2017 | Van der Auwera ... G06T 3/0062 |
| 2017/0287200 A1 | 10/2017 | Forutanpour et al. |
| 2017/0287220 A1 | 10/2017 | Khalid et al. |
| 2017/0295356 A1 | 10/2017 | Abbas et al. |
| 2017/0301065 A1 | 10/2017 | Adsumilli et al. |
| 2017/0301132 A1 | 10/2017 | Dalton et al. |
| 2017/0302714 A1 | 10/2017 | Ramsay et al. |
| 2017/0302951 A1 | 10/2017 | Joshi et al. |
| 2017/0309143 A1 | 10/2017 | Trani et al. |
| 2017/0322635 A1 | 11/2017 | Yoon et al. |
| 2017/0323422 A1 | 11/2017 | Kim et al. |
| 2017/0323423 A1 | 11/2017 | Lin et al. |
| 2017/0332107 A1 | 11/2017 | Abbas et al. |
| 2017/0336705 A1 | 11/2017 | Zhou et al. |
| 2017/0339324 A1 | 11/2017 | Tocher et al. |
| 2017/0339341 A1 | 11/2017 | Zhou et al. |
| 2017/0339391 A1 | 11/2017 | Zhou et al. |
| 2017/0339392 A1 | 11/2017 | Forutanpour et al. |
| 2017/0339415 A1 | 11/2017 | Wang et al. |
| 2017/0344843 A1 | 11/2017 | Wang et al. |
| 2017/0353737 A1 | 12/2017 | Lin et al. |
| 2017/0359590 A1 | 12/2017 | Zhang et al. |
| 2017/0366808 A1 | 12/2017 | Lin et al. |
| 2017/0374332 A1 | 12/2017 | Yamaguchi et al. |
| 2017/0374375 A1 | 12/2017 | Makar et al. |
| 2018/0005447 A1 | 1/2018 | Wallner et al. |
| 2018/0005449 A1 | 1/2018 | Wallner et al. |
| 2018/0007387 A1 | 1/2018 | Izumi |
| 2018/0007389 A1 | 1/2018 | Izumi |
| 2018/0018807 A1 | 1/2018 | Lu et al. |
| 2018/0020202 A1 | 1/2018 | Xu et al. |
| 2018/0020238 A1 | 1/2018 | Liu et al. |
| 2018/0027178 A1 | 1/2018 | Macmillan et al. |
| 2018/0027226 A1 | 1/2018 | Abbas et al. |
| 2018/0027257 A1 | 1/2018 | Izumi et al. |
| 2018/0047208 A1 | 2/2018 | Marin et al. |
| 2018/0048890 A1 | 2/2018 | Kim et al. |
| 2018/0053280 A1 | 2/2018 | Kim et al. |
| 2018/0054613 A1 | 2/2018 | Lin et al. |
| 2018/0061002 A1 | 3/2018 | Lee et al. |
| 2018/0063505 A1 | 3/2018 | Lee et al. |
| 2018/0063544 A1 | 3/2018 | Tourapis et al. |
| 2018/0075576 A1 | 3/2018 | Liu et al. |
| 2018/0075604 A1 | 3/2018 | Kim et al. |
| 2018/0075635 A1 | 3/2018 | Choi et al. |
| 2018/0077451 A1 | 3/2018 | Yip et al. |
| 2018/0084257 A1 | 3/2018 | Abbas |
| 2018/0091812 A1 | 3/2018 | Guo et al. |
| 2018/0098090 A1 | 4/2018 | Lin et al. |
| 2018/0101931 A1 | 4/2018 | Abbas et al. |
| 2018/0109810 A1 | 4/2018 | Xu et al. |
| 2018/0124312 A1* | 5/2018 | Chang ................... H04N 19/46 |
| 2018/0130243 A1 | 5/2018 | Kim et al. |
| 2018/0130264 A1 | 5/2018 | Ebacher |
| 2018/0146136 A1 | 5/2018 | Yamamoto |
| 2018/0146138 A1 | 5/2018 | Jeon et al. |
| 2018/0152636 A1 | 5/2018 | Yim et al. |
| 2018/0152663 A1 | 5/2018 | Wozniak et al. |
| 2018/0160113 A1 | 6/2018 | Jeong et al. |
| 2018/0160138 A1 | 6/2018 | Park |
| 2018/0160156 A1 | 6/2018 | Hannuksela et al. |
| 2018/0164593 A1 | 6/2018 | Van der Auwera et al. |
| 2018/0167613 A1 | 6/2018 | Hannuksela et al. |
| 2018/0167634 A1 | 6/2018 | Salmimaa et al. |
| 2018/0174619 A1 | 6/2018 | Roy et al. |
| 2018/0176468 A1 | 6/2018 | Wang et al. |
| 2018/0176536 A1 | 6/2018 | Jo et al. |
| 2018/0176596 A1 | 6/2018 | Jeong et al. |
| 2018/0176603 A1 | 6/2018 | Fujimoto |
| 2018/0184101 A1 | 6/2018 | Ho |
| 2018/0184121 A1 | 6/2018 | Kim et al. |
| 2018/0191787 A1 | 7/2018 | Morita et al. |
| 2018/0192074 A1 | 7/2018 | Shih et al. |
| 2018/0199029 A1 | 7/2018 | Van der Auwera et al. |

(56) References Cited

U.S. PATENT DOCUMENTS

| | | |
|---|---|---|
| 2018/0199034 A1 | 7/2018 | Nam et al. |
| 2018/0199070 A1 | 7/2018 | Wang |
| 2018/0218512 A1 | 8/2018 | Chan et al. |
| 2018/0220138 A1 | 8/2018 | He et al. |
| 2018/0227484 A1 | 8/2018 | Hung et al. |
| 2018/0234700 A1 | 8/2018 | Kim et al. |
| 2018/0240223 A1 | 8/2018 | Yi et al. |
| 2018/0240276 A1 | 8/2018 | He et al. |
| 2018/0242016 A1 | 8/2018 | Lee et al. |
| 2018/0242017 A1 | 8/2018 | Van Leuven et al. |
| 2018/0249076 A1 | 8/2018 | Sheng et al. |
| 2018/0249163 A1 | 8/2018 | Curcio et al. |
| 2018/0249164 A1 | 8/2018 | Kim et al. |
| 2018/0253879 A1 | 9/2018 | Li et al. |
| 2018/0262775 A1 | 9/2018 | Lee et al. |
| 2018/0268517 A1 | 9/2018 | Coban et al. |
| 2018/0270417 A1 | 9/2018 | Suitoh et al. |
| 2018/0276788 A1 | 9/2018 | Lee et al. |
| 2018/0276789 A1 | 9/2018 | Van der Auwera et al. |
| 2018/0276826 A1 | 9/2018 | Van der Auwera et al. |
| 2018/0276890 A1 | 9/2018 | Wang |
| 2018/0286109 A1 | 10/2018 | Woo et al. |
| 2018/0288435 A1 | 10/2018 | Boyce et al. |
| 2018/0295282 A1 | 10/2018 | Boyce et al. |
| 2018/0302621 A1 | 10/2018 | Fu et al. |
| 2018/0307398 A1 | 10/2018 | Kim et al. |
| 2018/0315245 A1 | 11/2018 | Patel |
| 2018/0322611 A1 | 11/2018 | Bang et al. |
| 2018/0329482 A1 | 11/2018 | Woo et al. |
| 2018/0332265 A1 | 11/2018 | Hwang et al. |
| 2018/0332279 A1 | 11/2018 | Kang et al. |
| 2018/0338142 A1 | 11/2018 | Kim et al. |
| 2018/0343388 A1 | 11/2018 | Matsushita |
| 2018/0349705 A1 | 12/2018 | Kim et al. |
| 2018/0350407 A1 | 12/2018 | Decoodt et al. |
| 2018/0352225 A1 | 12/2018 | Guo et al. |
| 2018/0352259 A1 | 12/2018 | Guo et al. |
| 2018/0352264 A1 | 12/2018 | Guo et al. |
| 2018/0359487 A1* | 12/2018 | Bang ............... H04N 19/40 |
| 2018/0374192 A1 | 12/2018 | Kunkel et al. |
| 2018/0376126 A1 | 12/2018 | Hannuksela |
| 2018/0376152 A1 | 12/2018 | Wang et al. |
| 2019/0004414 A1 | 1/2019 | Kim et al. |
| 2019/0007669 A1 | 1/2019 | Kim et al. |
| 2019/0007679 A1 | 1/2019 | Coban et al. |
| 2019/0007684 A1 | 1/2019 | Van der Auwera et al. |
| 2019/0012766 A1 | 1/2019 | Yoshimi |
| 2019/0014304 A1 | 1/2019 | Curcio et al. |
| 2019/0026858 A1 | 1/2019 | Lin et al. |
| 2019/0026934 A1 | 1/2019 | Shih et al. |
| 2019/0026956 A1 | 1/2019 | Gausebeck et al. |
| 2019/0028642 A1 | 1/2019 | Fujita et al. |
| 2019/0045212 A1 | 2/2019 | Rose et al. |
| 2019/0057487 A1 | 2/2019 | Cheng |
| 2019/0057496 A1 | 2/2019 | Ogawa et al. |
| 2019/0082184 A1 | 3/2019 | Hannuksela |
| 2019/0104315 A1 | 4/2019 | Guo et al. |
| 2019/0108611 A1 | 4/2019 | Izumi |
| 2019/0132591 A1 | 5/2019 | Fujita et al. |
| 2019/0132594 A1 | 5/2019 | Chung et al. |
| 2019/0141318 A1 | 5/2019 | Li et al. |
| 2019/0158800 A1 | 5/2019 | Kokare et al. |
| 2019/0191170 A1 | 6/2019 | Zhao et al. |
| 2019/0200016 A1 | 6/2019 | Jang et al. |
| 2019/0200023 A1 | 6/2019 | Hanhart et al. |
| 2019/0215512 A1 | 7/2019 | Lee et al. |
| 2019/0215532 A1 | 7/2019 | He et al. |
| 2019/0230285 A1 | 7/2019 | Kim |
| 2019/0230337 A1 | 7/2019 | Kim |
| 2019/0230368 A1 | 7/2019 | Zhao et al. |
| 2019/0230377 A1* | 7/2019 | Ma ............... H04N 19/105 |
| 2019/0236990 A1 | 8/2019 | Song et al. |
| 2019/0238888 A1 | 8/2019 | Kim |
| 2019/0246141 A1 | 8/2019 | Kim et al. |
| 2019/0253622 A1 | 8/2019 | Van der Auwera et al. |
| 2019/0253624 A1 | 8/2019 | Kim |
| 2019/0253703 A1 | 8/2019 | Coban et al. |
| 2019/0260990 A1 | 8/2019 | Lim et al. |
| 2019/0268594 A1 | 8/2019 | Lim et al. |
| 2019/0272616 A1 | 9/2019 | Lee et al. |
| 2019/0273929 A1 | 9/2019 | Ma et al. |
| 2019/0273949 A1 | 9/2019 | Kim et al. |
| 2019/0281217 A1 | 9/2019 | Kim |
| 2019/0281273 A1 | 9/2019 | Lin et al. |
| 2019/0281290 A1 | 9/2019 | Lee et al. |
| 2019/0289324 A1 | 9/2019 | Budagavi |
| 2019/0289331 A1 | 9/2019 | Byun |
| 2019/0297341 A1 | 9/2019 | Zhou |
| 2019/0297350 A1 | 9/2019 | Lin et al. |
| 2019/0306515 A1 | 10/2019 | Shima |
| 2019/0355126 A1 | 11/2019 | Sun et al. |
| 2019/0379893 A1 | 12/2019 | Krishnan |
| 2019/0387251 A1 | 12/2019 | Lin et al. |
| 2020/0029077 A1 | 1/2020 | Lee et al. |
| 2020/0036976 A1 | 1/2020 | Kanoh et al. |
| 2020/0045323 A1 | 2/2020 | Hannuksela |
| 2020/0058165 A1 | 2/2020 | Choi et al. |
| 2020/0074587 A1 | 3/2020 | Lee et al. |
| 2020/0074687 A1 | 3/2020 | Lin et al. |
| 2020/0077092 A1 | 3/2020 | Lin et al. |
| 2020/0084441 A1 | 3/2020 | Lee et al. |
| 2020/0120340 A1 | 4/2020 | Park et al. |
| 2020/0120359 A1 | 4/2020 | Hanhart et al. |
| 2020/0137401 A1 | 4/2020 | Kim et al. |
| 2020/0137418 A1 | 4/2020 | Onno et al. |
| 2020/0153885 A1 | 5/2020 | Lee et al. |
| 2020/0162731 A1 | 5/2020 | Kim et al. |
| 2020/0213570 A1 | 7/2020 | Shih et al. |
| 2020/0213571 A1 | 7/2020 | Kim et al. |
| 2020/0213587 A1 | 7/2020 | Galpin et al. |
| 2020/0234399 A1 | 7/2020 | Lin et al. |
| 2020/0244957 A1 | 7/2020 | Sasai et al. |
| 2020/0252650 A1 | 8/2020 | Shih et al. |
| 2020/0260082 A1 | 8/2020 | Lim et al. |
| 2020/0260120 A1 | 8/2020 | Hanhart et al. |
| 2020/0267385 A1 | 8/2020 | Lim et al. |
| 2020/0396461 A1 | 12/2020 | Zhao et al. |
| 2021/0006714 A1 | 1/2021 | Kim |
| 2021/0006838 A1 | 1/2021 | Lee et al. |

FOREIGN PATENT DOCUMENTS

| | | |
|---|---|---|
| JP | 2008-193458 A | 8/2008 |
| JP | 2012-160886 A | 8/2012 |
| JP | 2014-176034 A | 9/2014 |
| KR | 2017-0015938 A | 2/2017 |
| WO | WO 2012/044709 A1 | 4/2012 |
| WO | WO 2015/138979 A2 | 9/2015 |
| WO | WO 2015/184416 A1 | 12/2015 |
| WO | WO 2016/076680 A1 | 5/2016 |
| WO | WO 2016/140060 A1 | 9/2016 |
| WO | WO 2017/125030 A1 | 7/2017 |
| WO | WO 2017/127816 A1 | 7/2017 |
| WO | WO 2018/118159 A1 | 6/2018 |

OTHER PUBLICATIONS

He et al.; "AHG8: Geometry padding for 360 video coding"; Joint Video Exploration Team (JVET); Document: JVET-D0075; Oct. 2016; 10 pages.

Vishwanath et al.; "Rotational Motion Model for Temporal Prediction in 360 Video Coding"; IEEE 19$^{th}$ Int'l Workshop on Multimedia Signal Processing; Oct. 2017; 6 pages.

Sauer et al.; "Improved Motion Compensation for 360 Video Projected to Polytopes" Proceedings of the IEEE Int'l Conf. on Multimedia and Expo; Jul. 2017; p. 61-66.

International Patent Application No. PCT/US2018/017124; Int'l Search Report and the Written Opinion; dated Apr. 30, 2018; 19 pages.

International Patent Application No. PCT/US2018/017124; Int'l Preliminary Report on Patentability; dated Aug. 29, 2019; 12 pages.

He et al.; "AHG8: InterDigital's projection format conversion tool";

(56) References Cited

OTHER PUBLICATIONS

Joint Video Exploration Team (JVET) of ITU-T SG 16 WP3 and ISO/IEC JTC 1/SC 29/WG 11 4$^{th}$ meeting; Oct. 2016; 18 pages.

Kammachi et al.; "AHG8: Test results for viewport-dependent pyramid, cube map, and equirectangular panorama schemes"; JVET-D00078; Oct. 2016; 7 pages.

Yip et al.; "Technologies under Considerations for ISO/IEC 23000-20 Omnidirectional Media Application Format"; ISO/IEC JTC1/SC29/WG11 MPEG2017/W16637; Jan. 2017; 50 pages.

International Patent Application No. PCT/US2018/018246; Int'l Search Report and the Written Opinion; dated Apr. 20, 2018; 15 pages.

Boyce et al.; "Common Test Conditions and Evaluation Procedures for 360 degree Video Coding"; Joint Video Exploration Team; ITU-T SG 16 WP 3 and ISO/IEC JTC 1/SC 29/WG 11; Doc. JVET-D1030; Oct. 2016; 6 pages.

Li et al.; "Projection Based Advanced Motion Model for Cubic Mapping for 360-Degree Video"; Cornell University Library; 2017; 5 pages.

Zheng et al.; "Adaptive Selection of Motion Models for Panoramic Video Coding"; IEEE Int'l Conf. Multimedia and Expo; Jul. 2007; p. 1319-1322.

He et al.; "AHG8: Algorithm description of InterDigital's projection format conversion tool (PCT360)"; Joint Video Exploration Team; ITU-T SG 16 WP 3 and ISO/IEC JTC 1/SC 29/WG 11; Doc. JVET-D0090; Oct. 2016; 6 pages.

International Patent Application No. PCT/US2017/051542; Int'l Search Report and the Written Opinion; dated Dec. 7, 2017; 17 pages.

International Patent Application No. PCT/US2017/051542; Int'l Preliminary Report on Patentability; dated Jul. 4, 2019; 10 pages.

Choi et al.; "Text of ISO/IEC 23000-20 CD Omnidirectional Media Application Format"; Coding of Moving Pictures and Audio; ISO/IEC JTC1/SC29/WG11 N16636; Jan. 2017; 48 pages.

International Patent Application No. PCT/US2018/018246; Int'l Preliminary Report on Patentability; dated Sep. 6, 2019; 8 pages.

Sauer et al.; "Geometry correction for motion compensation of planar-projected 360VR video"; Joint Video Exploration Team; Document: JVET-D0067; Oct. 2016; 13 pages.

Minhua Zou; "AHG8: Unrestricted Motion Compensation for 360 Video in ERP Format"; Joint Video Exploration; JVET-E0065; 2017; Broadcom; 4 pages.

\* cited by examiner

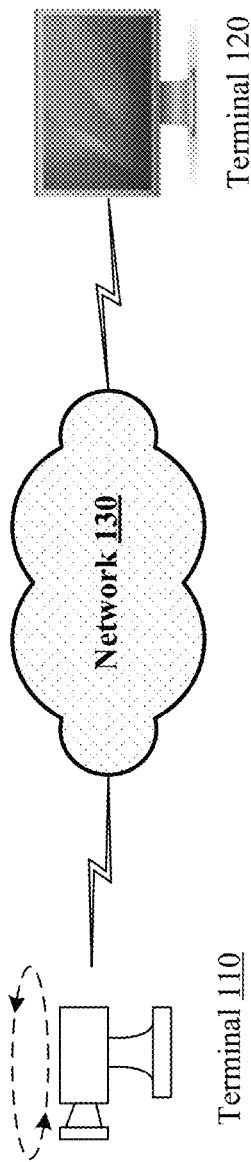
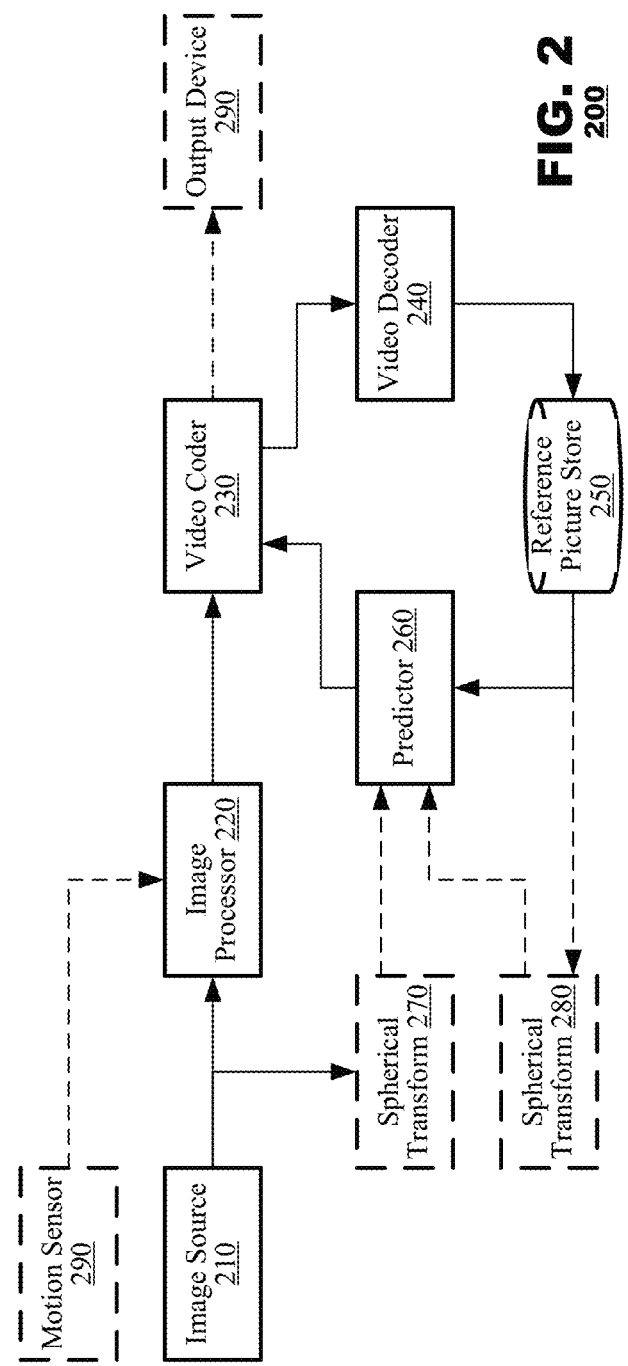

300

400

700

800

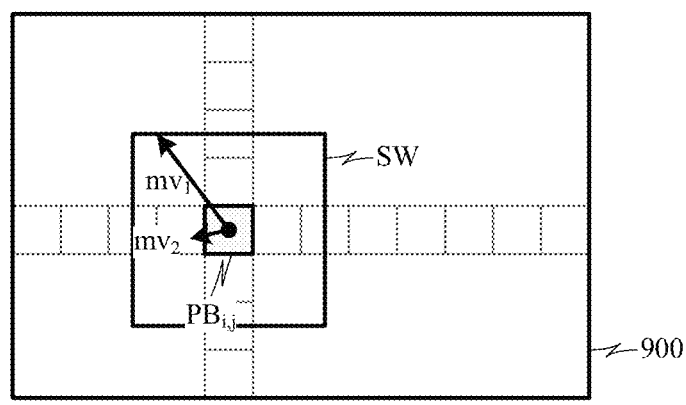
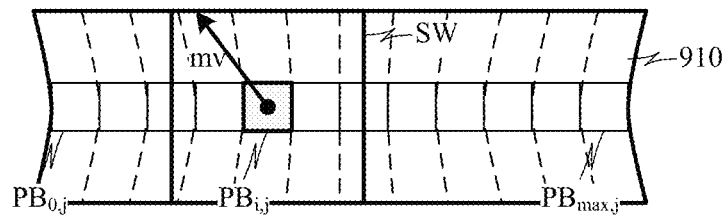
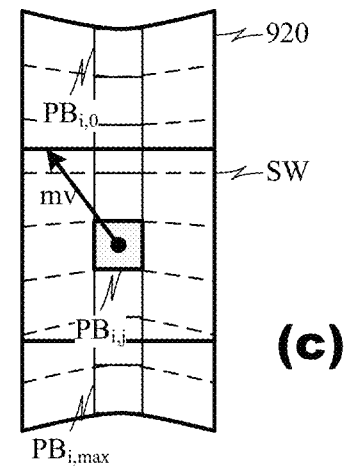
FIG. 9

1000

1100

1200

PROCESSING OF EQUIRECTANGULAR OBJECT DATA TO COMPENSATE FOR DISTORTION BY SPHERICAL PROJECTIONS

BACKGROUND

The present disclosure relates to coding techniques for omnidirectional and multi-directional images and videos.

Some modern imaging applications capture image data from multiple directions about a camera. Some cameras pivot during image capture, which allows a camera to capture image data across an angular sweep that expands the camera's effective field of view. Some other cameras have multiple imaging systems that capture image data in several different fields of view. In either case, an aggregate image may be created that represents a merger or "stitching" of image data captured from these multiple views.

Many modern coding applications are not designed to process such omnidirectional or multi-directional image content. Such coding applications are designed based on an assumption that image data within an image is "flat" or captured from a single field of view. Thus, the coding applications do not account for image distortions that can arise when processing these omnidirectional or multi-directional images with the distortions contained within them. These distortions can cause ordinary video coders to fail to recognize redundancies in image content, which leads to inefficient coding.

Accordingly, the inventors perceive a need in the art for coding techniques that can process omnidirectional and multi-directional image content and limit distortion.

BRIEF DESCRIPTION OF THE DRAWINGS

FIG. 1 illustrates a system in which embodiments of the present disclosure may be employed.

FIG. 2 is a functional block diagram of a coding system according to an embodiment of the present disclosure.

FIG. 9 illustrates transforms that may be applied to reference frame data according to the method of FIG. 8.

DETAILED DESCRIPTION

Figure 3:
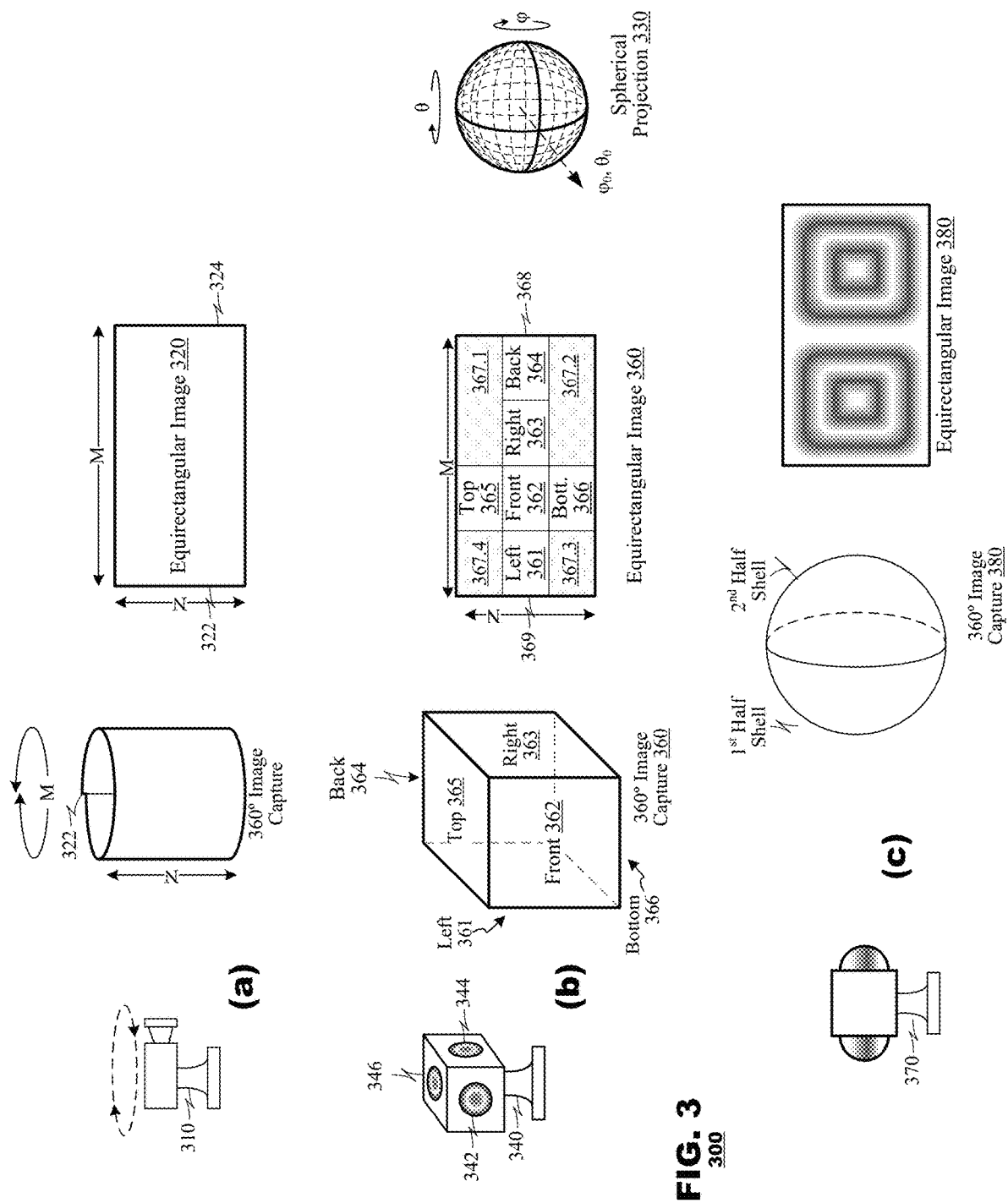
FIG. 3 illustrates image sources that find use with embodiments of the present disclosure.

Embodiments of the present disclosure provide techniques for coding spherical image and video. For each pixel block in a frame to be coded, an encoder may transform reference picture data within a search window about a location of the input pixel block based on displacement respectively between the location of the input pixel block and portions of the reference picture within the search window. The encoder may perform a prediction search among the transformed reference picture data to identify a match between the input pixel block and a portion of the transformed reference picture and, when a match is identified, the encoder may code the input pixel block differentially with respect to the matching portion of the transformed reference picture. The transform may counter-act distortions imposed on image content of the reference picture data by the spherical projection format, which aligns the content with image content of the input picture.

FIG. 1 illustrates a system 100 in which embodiments of the present disclosure may be employed. The system 100 may include at least two terminals 110-120 interconnected via a network 130. The first terminal 110 may have an image source that generates multi-directional and omnidirectional video. The terminal 110 also may include coding systems and transmission systems (not shown) to transmit coded representations of the multi-directional video to the second terminal 120, where it may be consumed. For example, the second terminal 120 may display the spherical video on a local display, it may execute a video editing program to modify the spherical video, or may integrate the spherical video into an application (for example, a virtual reality program), may present in head mounted display (for example, virtual reality applications) or it may store the spherical video for later use.

FIG. 1 illustrates components that are appropriate for unidirectional transmission of spherical video, from the first terminal 110 to the second terminal 120. In some applications, it may be appropriate to provide for bidirectional exchange of video data, in which case the second terminal 120 may include its own image source, video coder and transmitters (not shown), and the first terminal 110 may include its own receiver and display (also not shown). If it is desired to exchange spherical video bidirectionally, then the techniques discussed hereinbelow may be replicated to generate a pair of independent unidirectional exchanges of spherical video. In other applications, it would be permissible to transmit spherical video in one direction (e.g., from the first terminal 110 to the second terminal 120) and transmit "flat" video (e.g., video from a limited field of view) in a reverse direction.

In FIG. 1, the second terminal 120 is illustrated as a computer display but the principles of the present disclosure are not so limited. Embodiments of the present disclosure find application with laptop computers, tablet computers, smart phones, servers, media players, virtual reality head mounted displays, augmented reality display, hologram displays, and/or dedicated video conferencing equipment. The network 130 represents any number of networks that convey coded video data among the terminals 110-120, including, for example, wireline and/or wireless communication networks. The communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present disclosure unless explained hereinbelow.

FIG. 2 is a functional block diagram of a coding system 200 according to an embodiment of the present disclosure. The system 200 may include an image source 210, an image processing system 220, a video coder 230, a video decoder 240, a reference picture store 250, a predictor 260 and, optionally, a pair of spherical transform units 270, 280. The image source 210 may generate image data as a multi-directional image, containing image data of a field of view that extends around a reference point in multiple directions. The image processing system 220 may convert the image data from the image source 210 as needed to fit requirements of the video coder 230. The video coder 230 may generate a coded representation of its input image data, typically by exploiting spatial and/or temporal redundancies in the image data. The video coder 230 may output a coded representation of the input data that consumes less bandwidth than the input data when transmitted and/or stored.

The video decoder 240 may invert coding operations performed by the video encoder 230 to obtain a reconstructed picture from the coded video data. Typically, the coding processes applied by the video coder 230 are lossy processes, which cause the reconstructed picture to possess various errors when compared to the original picture. The video decoder 240 may reconstruct picture of select coded pictures, which are designated as "reference pictures," and store the decoded reference pictures in the reference picture store 250. In the absence of transmission errors, the decoded reference pictures will replicate decoded reference pictures obtained by a decoder (not shown in FIG. 2).

The predictor 260 may select prediction references for new input pictures as they are coded. For each portion of the input picture being coded (called a "pixel block" for convenience), the predictor 260 may select a coding mode and identify a portion of a reference picture that may serve as a prediction reference search for the pixel block being coded. The coding mode may be an intra-coding mode, in which case the prediction reference may be drawn from a previously-coded (and decoded) portion of the picture being coded. Alternatively, the coding mode may be an inter-coding mode, in which case the prediction reference may be drawn from another previously-coded and decoded picture.

In an embodiment, the predictor 260 may search for prediction references of pictures being coded operating on input picture and reference picture that has been transformed to a spherical projection representation. The spherical transform units 270, 280 may transform the input picture and the reference picture to the spherical projection representations.

When an appropriate prediction reference is identified, the predictor 260 may furnish the prediction data to the video coder 230. The video coder 230 may code input video data differentially with respect to prediction data furnished by the predictor 260. Typically, prediction operations and the differential coding operate on a pixel block-by-pixel block basis. Prediction residuals, which represent pixel-wise differences between the input pixel blocks and the prediction pixel blocks, may be subject to further coding operations to reduce bandwidth further.

As indicated, the coded video data output by the video coder 230 should consume less bandwidth than the input data when transmitted and/or stored. The coding system 200 may output the coded video data to an output device 290, such as a transmitter (not shown) that may transmit the coded video data across a communication network 130 (FIG. 1) or a storage device (also not shown) such as an electronic-, magnetic- and/or optical storage medium.

FIG. 3 illustrates image sources 310, 340 that find use with embodiments of the present disclosure. A first image source may be a camera 310, shown in FIG. 3(a), that has a single image sensor (not shown) that pivots along an axis. During operation, the camera 310 may capture image content as it pivots along a predetermined angular distance (preferably, a full 360 degrees) and merge the captured image content into a 360° image. The capture operation may yield an equirectangular image 320 having predetermined dimension M×N pixels. The equirectangular picture 320 may represent a multi-directional field of view 320 having been partitioned along a slice 322 that divides a cylindrical field of view into a two dimensional array of data. In the equirectangular picture 320, pixels on either edge 322, 324 of the image 320 represent adjacent image content even though they appear on different edges of the equirectangular picture 320.

Optionally, the equirectangular image 320 may be transformed to a spherical projection. The spherical transform unit 270 may transform pixel data at locations (x,y) within the equirectangular picture 320 to locations (θ, φ) along a spherical projection 320 according to a transform such as:

$$\theta = x + \theta_0, \text{ and} \quad (Eq. 1.)$$

$$\varphi = y + \varphi_0, \text{ where} \quad (Eq. 2.)$$

θ and φ respectively represents the longitude and latitude of a location in the spherical projection 330, $\theta_0$, $\varphi_0$ represent an origin of the spherical projection 330, and x and y represent the horizontal and vertical coordinates of the source data in the equirectangular picture 320.

When applying the transform, the spherical transform unit 270 may transform each pixel location along a predetermined row of the equirectangular picture 320 to have a unique location at an equatorial latitude in the spherical projection 330. In such regions, each location in the spherical projection 330 may be assigned pixel values from corresponding locations of the equirectangular picture 320. At other locations, particularly toward poles of the spherical projection 330, the spherical projection unit 270 may map several source locations from the equirectangular picture 320 to a common location in the spherical projection 330. In such a case, the spherical projection unit 270 may derive pixel values for the locations in the spherical projection 330 from a blending of corresponding pixel values in the equirectangular picture 320 (for example, by averaging pixel values at corresponding locations of the equirectangular picture 320).

FIG. 3(b) illustrates image capture operations of another type of image source, an omnidirectional camera 340. In this embodiment, a camera system 340 may perform a multi-directional capture operation and output a cube map picture 360 having dimensions M×N pixels in which image content is arranged according to a cube map capture 350. The image capture may capture image data in each of a predetermined number of directions (typically, six) which are stitched together according to the cube map layout. In the example illustrated in FIG. 3, six sub-images corresponding to a left view 361, a front view 362, a right view 363, a back view 364, a top view 365 and a bottom view 366 may be captured, stitched and arranged within the multi-directional picture 360 according to "seams" of image content between the respective views. Thus, as illustrated in FIG. 3, pixels from the front image that are adjacent to the pixels from each of the top, the left, the right and the bottom images represent image content that is adjacent respectively to content of the adjoining sub-images. Similarly, pixels from the right and back images that are adjacent to each other represent adjacent image content. Further, content from a terminal edge 368 of the back image is adjacent to content from an opposing terminal edge 369 of the left image. The cube map picture 360 also may have regions 367.1-367.4 that do not belong to any image.

Optionally, the cube map image 360 may be transformed to a spherical projection 330. The spherical transform unit 270 may transform pixel data at locations (x,y) within the cube map picture 360 to locations (θ, φ) along a spherical projection 330 according to transforms derived from each sub-image in the cube map. FIG. 3 illustrates six faces 361-366 of the image capture 360 superimposed over the spherical projection 330 that is to be generated. Each sub-image of the image capture corresponds to a predetermined angular region of a surface of the spherical projection 330. Thus, image data of the front face 362 may be projected to a predetermined portion on the surface of the spherical projection, and image data of the left, right, back, top and bottom sub-images may be projected on corresponding portions of the surface of the spherical projection 330.

In a cube map having square sub-images, that is, height and width of the sub-images 361-366 are equal, each sub-image projects to a 90°×90° region of the projection surface. Thus, each position x,y with a sub-image maps to a θ, φ location on the spherical projection 330 based on a sinusoidal projection function of the form $\varphi=f^k(x, y)$ and $\theta=g^k(x, y)$, where x,y represent displacements from a center of the cube face k for top, bottom, front, right, left, right and θ, φ represent angular deviations in the sphere.

When applying the transform, some pixel locations in the cube map picture 360 may map to a unique location in the spherical projection 330. In such regions, each location in the spherical projection 330 may be assigned pixel values from corresponding locations of the cube map picture 360. At other locations, particularly toward edges of the respective sub-images, the spherical projection unit 270 may map image data from several source locations in the cube map picture 360 to a common location in the spherical projection 430. In such a case, the spherical projection unit 270 may derive pixel values for the locations in the spherical projection 430 from a blending of corresponding pixel values in the cube map picture 360 (for example, by a weighted averaging pixel values at corresponding locations of cube map picture 360).

FIG. 3(c) illustrates image capture operations of another type of image source, a camera 370 having a pair of fish-eye lenses. In this embodiment, each lens system captures data in a different 180° field of view, representing opposed "half shells." The camera 370 may generate an image 380 from a stitching of images generated from each lens system. Fish eye lenses typically induce distortion based on object location within each half shell field of view. In an embodiment, the multi-directional image 380 may be transformed to a spherical projection 330.

The techniques of the present disclosure find application with other types of image capture techniques. For example, truncated pyramid-, tetrahedral-, octahedral-, dodecahedral- and icosahedral-based image capture techniques may be employed. Images obtained therefrom may be mapped to a spherical projection through analogous techniques.

Image sources need not include cameras. In other embodiments, an image source 210 (FIG. 2) may be a computer application that generates 360° image data. For example, a gaming application may model a virtual world in three dimensions and generate a spherical image based on synthetic content. And, of course, a spherical image may contain both natural content (content generated from a camera) and synthetic content (computer graphics content) that has been merged together by a computer application.

Figure 4:
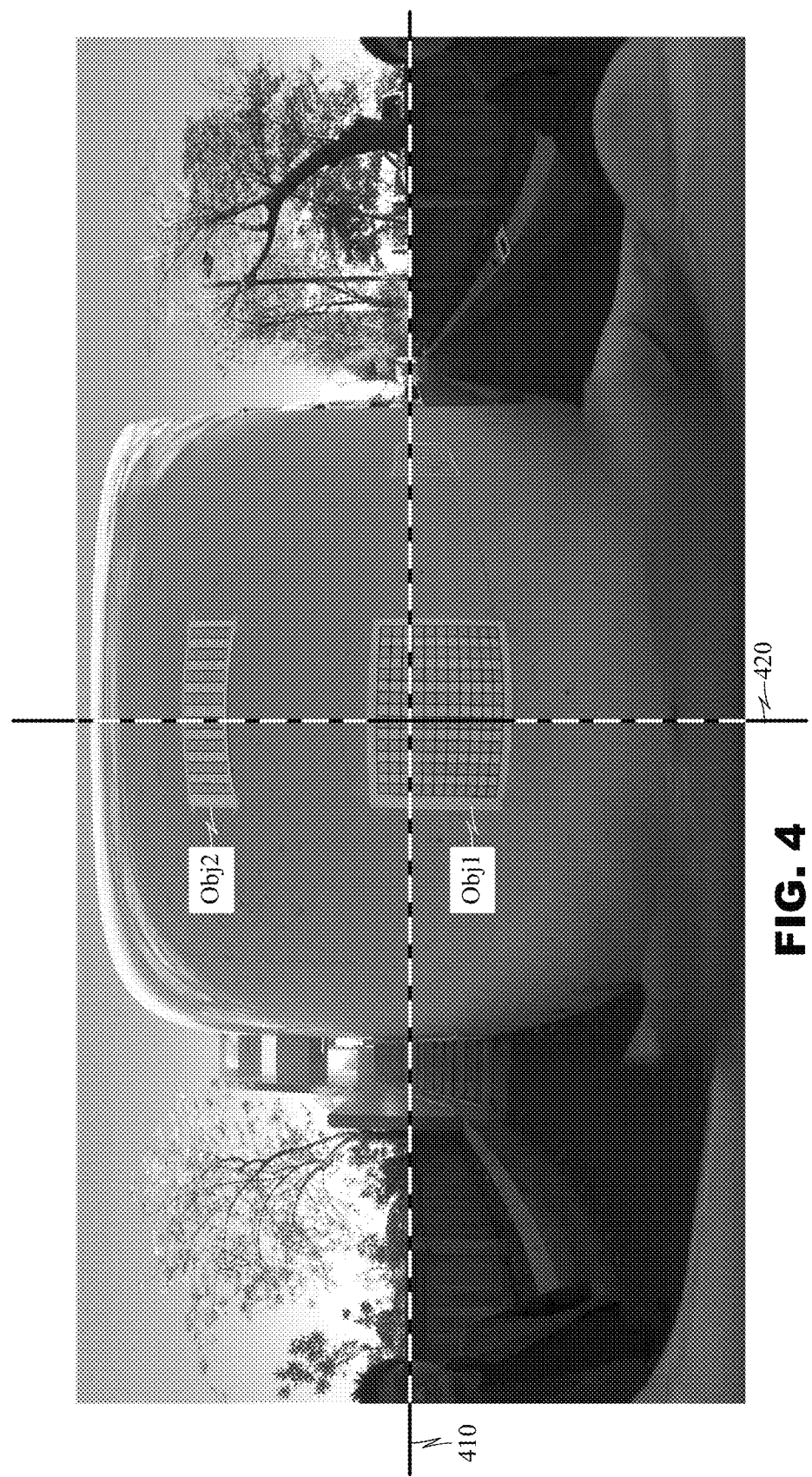
FIG. 4 illustrates an exemplary equirectangular projection image captured by multi-directional imaging.

Multi-directional imaging systems typically generate image data that contains spatial distortions of image content. FIG. 4 illustrates an exemplary equirectangular image captured by a multi-directional imaging system. The image illustrates, among other things, two objects Obj1 and Obj2, each of the same size. When captured by a multi-directional imaging system, the objects appear to have different sizes based on their location in the equirectangular image. For example, object Obj1 is located fairly close to central axes 410, 420 and, as a result, exhibits a lower level of distortion than the object Obj2. Even so, edges of the object Obj1 exhibit distortion (curvature of straight lines) to a larger degree than portions of the object that are closer to the horizontal axis 410. Object Obj2 is displaced from the horizontal axis 410 much farther than any portion of the object Obj1 and, as a consequence, distortions both of the object's height, which is approximately 32% of the height of object Obj1 in the illustration of FIG. 4, and curvature of horizontal image components of the object Obj1.

Figure 5:
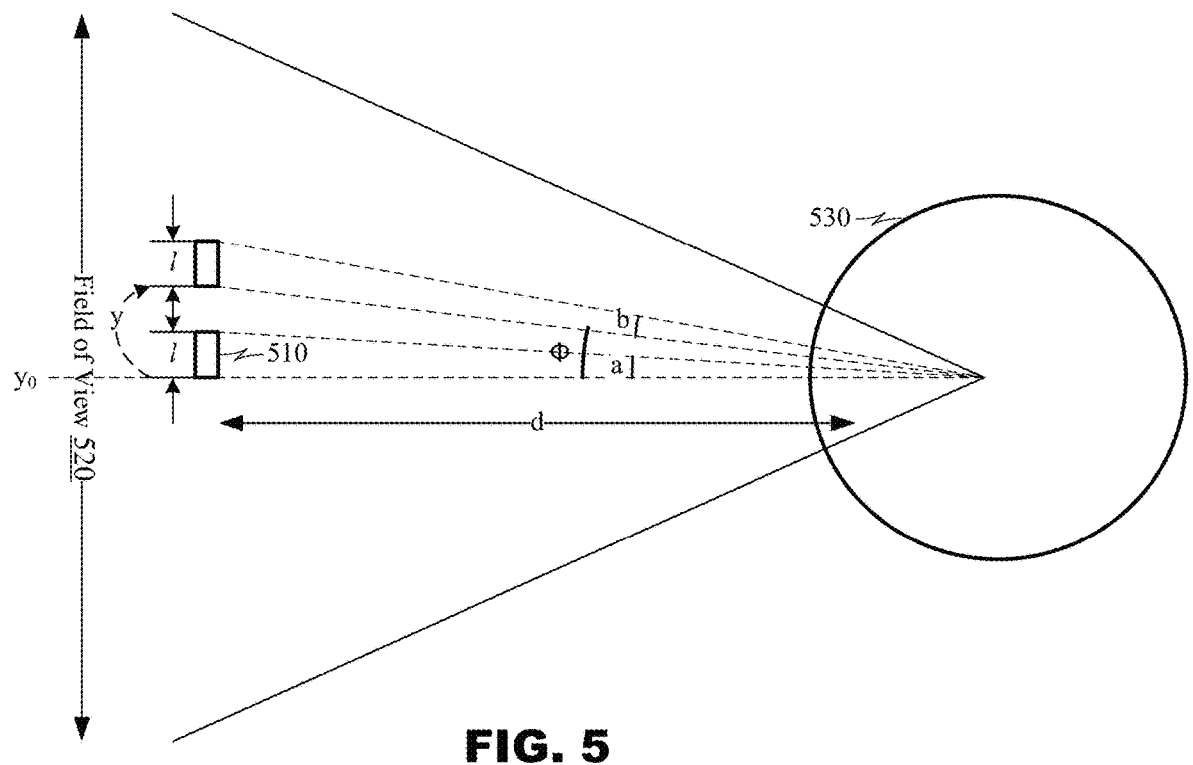
FIG. 5 models distortion effects that may arise in spherical images.

FIG. 5 models distortion effects that may arise in spherical image projections. In two dimensional, "flat" video, lateral motion of an object is captured by a flat image sensor, which causes the size of a moving object to remain consistent. When such image data is projected onto a spherical surface, object motion can cause distortion of image data. Consider the example shown in FIG. 5, where an object 510 having a length l moves from a position at the center of object's motion plane 520 to another position away from the center by a distance y. For discussion purposes, it may be assumed that the object 510 is located at a common distance d from a center of the spherical projection.

Mathematically, the distortion can be modeled as follows:

$$\tan(a) = \frac{l}{d} \tag{1}$$

$$\tan(\Phi) = \frac{y}{d} \tag{2}$$

$$\tan(\Phi + b) = \frac{y+l}{d} \tag{3}$$

$$b = \tan^{-1}\left(\frac{y+l}{d}\right) - \Phi = \tan^{-1}\left(\frac{y+l}{d}\right) - \tan^{-1}\left(\frac{y}{d}\right) \tag{4}$$

Thus, when an object moves from the center $y_0$ of a projection field of view by a distance y, the ratio of the object's length l in the spherical projection may be given as:

$$\frac{b}{a} = \frac{\tan^{-1}\left(\frac{y+l}{d}\right) - \tan^{-1}\left(\frac{y}{d}\right)}{a} = \frac{\tan^{-1}\left(\frac{y+l}{d}\right) - \tan^{-1}\left(\frac{y}{d}\right)}{\tan^{-1}\left(\frac{y0+l}{d}\right) - \tan^{-1}\left(\frac{y0}{d}\right)} \tag{5}$$

Stated in simpler terms, the object's apparent length varies based on its displacement from the center of the projection.

Figure 6:
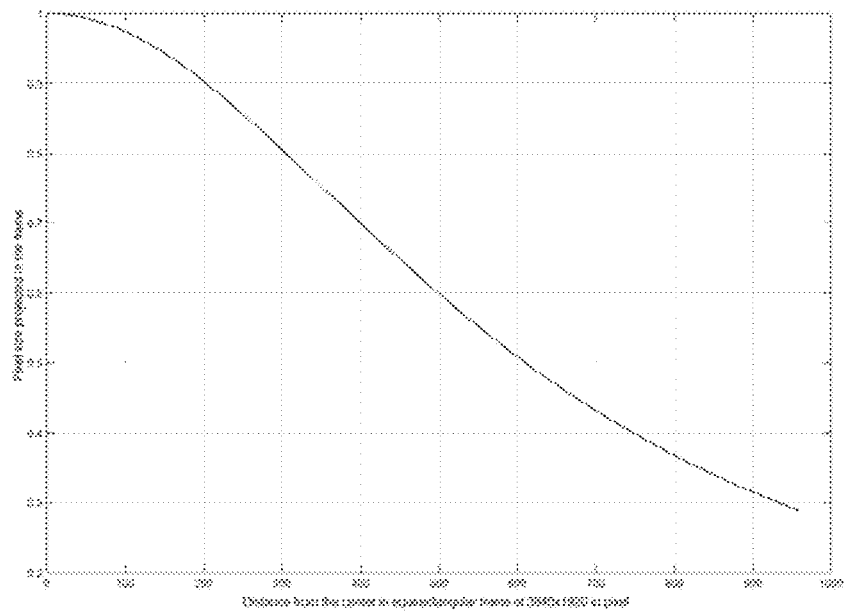
FIG. 6 is a graph illustrating distortion an exemplary object in an exemplary equirectangular frame.

FIG. 6 is a graph illustrating distortion of an exemplary object in an exemplary equirectangular frame. Here, the equirectangular image is of size 3,820 pixels by 1,920 pixels. In the spherical projection, each angular unit of the sphere, therefore, may be taken as $$\frac{\pi}{1920} \frac{1}{\tan\left(\frac{\pi}{1920}\right)}.$$

radians and the length l is the height of a single pixel, equal to 1. The distance d may be taken as FIG. 6 illustrates distortion of the length l as y changes from 0 to 960.

As illustrated in FIG. 4, the distortions described in FIG. 6 and in Equations (1)-(5) can occur in multiple dimensions simultaneously. Thus, distortions may arise in a vertical direction when an object 410 moves in a vertical direction with respect to the equirectangular source image. Additional distortions may arise in a horizontal direction when an object moves in a horizontal direction with respect to the equirectangular source image. Thus, the equations (1)-(5) above can be applied to lateral movement in a horizontal direction X as:

$$\tan(a) = \frac{l}{d} \quad (6)$$

$$\tan(\Phi) = \frac{x}{d} \quad (7)$$

$$\tan(\Phi + b) = \frac{x+w}{d} \quad (8)$$

$$b = \tan^{-1}\left(\frac{x+w}{d}\right) - \Phi = \tan^{-1}\left(\frac{x+w}{d}\right) - \tan^{-1}\left(\frac{x}{d}\right) \quad (9)$$

Thus, when an object moves from the center $x_0$ of a projection field of view by a distance x, the ratio of the object's width w in the spherical projection max may be given as:

$$\frac{b}{a} = \frac{\tan^{-1}\left(\frac{x+w}{d}\right) - \tan^{-1}\left(\frac{x}{d}\right)}{a} = \frac{\tan^{-1}\left(\frac{x+w}{d}\right) - \tan^{-1}\left(\frac{x}{d}\right)}{\tan^{-1}\left(\frac{x_0+w}{d}\right) - \tan^{-1}\left(\frac{x_0}{d}\right)} \quad (10)$$

According to an embodiment of the present disclosure, a terminal may model distortions that are likely to occur in image data when objects are projected to spherical domain representation or equirectangular representation, then use the model to correct data in the spherical-domain or equirectangular representation to counteract the distortions.

At a high level, embodiments of the present disclosure perform transforms on candidate reference frame data to invert distortions that occur in multi-images. For example, returning to FIG. 4, if image data of object Obj2 were present in a reference frame, the image data of object Obj2 could serve as an adequate prediction reference of object Obj1 that appears in an input frame to be coded. The two objects have the same image content and, absent distortions that arise from the imaging process, the same size. Embodiments of the present disclosure transform reference picture data according to the relationships identified in Equations (5) and (10) to generate transformed reference picture data that may provide a better fit to image data being coded.

Figure 7:
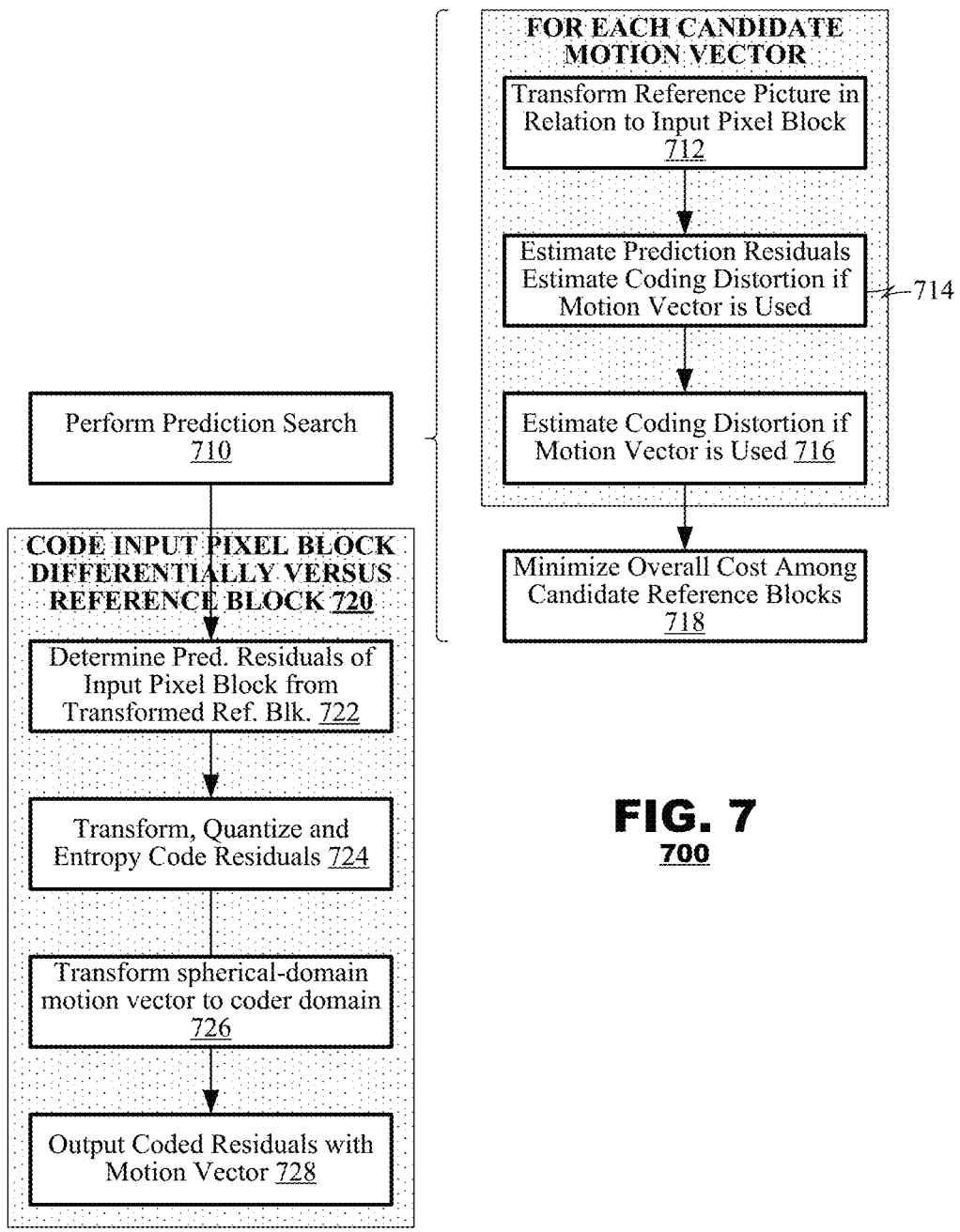
FIG. 7 illustrates a coding method according to an embodiment of the present disclosure.

FIG. 7 illustrates a coding method 700 according to an embodiment of the present disclosure. The method 700 may operate on a pixel-block by pixel-block basis to code a new input picture that is to be coded. The method 700 may perform a prediction search (box 710) from a comparison between an input pixel block data and reference picture data that is transformed to counter-act imaging distortion. When an appropriate prediction reference is found, the method 700 may code the input pixel block differentially using the transformed reference picture data (the "reference block," for convenience) as a basis for prediction (box 720). Typically, this differential coding includes a calculation of pixel residuals from a pixel-wise subtraction of prediction block data from the input pixel block data (box 822) and a transformation, quantization and entropy coding of the pixel residuals obtained therefrom (box 724). In this regard, the method 700 may adhere to coding protocols defined by a prevailing coding specification, such as ITU H.265 (also known as "HEVC"), H.264 (also, "AVC") or a predecessor coding specification. These specifications define protocols for defining pixel blocks, defining search windows for prediction references, and for performing differential coding of pixel blocks with reference to reference blocks. The method 700 also may transform spherical-domain representation of the motion vector to a coder-domain representation, the representation used by the video coding specification (box 726). The method 700 may output the coded pixel residuals, motion vectors and other metadata associated with prediction (typically, coding mode indicators and reference picture IDs) (box 728).

The prediction search (box 710) may include a transform of reference picture data to invert imaging-induced distortion. For each candidate motion vector available in a search window of the prediction search, the method 700 may transform the reference frame based on spatial displacement represented by the motion vector from the input pixel block (box 712). The method 700 may estimate prediction residuals that would be obtained if the candidate motion vector were used (box 714). These computations may be performed by a pixel-wise comparison of the input pixel block and the transformed reference frame that corresponds to the motion vector. Typically, when the comparisons generate pixel residuals of high magnitude and high variance, it indicates lower coding efficiencies than comparisons of other reference blocks that generate pixel residuals having lower magnitude and lower variance. The method 700 also may estimate coding distortions that would arise if the transformed reference block were used (box 716). These computations may be performed by estimating loss of pixel residuals based on quantization parameter levels that are predicted to be applied to the input pixel block. Once estimates have been obtained for all candidate motion vectors under consideration, the method 700 may select the motion vector that minimizes overall coding cost (box 718).

For example, the coding cost J of an input pixel block with reference to a candidate "reference block" $BLK_{mv}$ that is generated according to a motion vector my may be given as:

$$J = \text{Bits}(BLK_{mv}) + k \cdot \text{DIST}(BLK_{mv}), \text{ where} \quad (11)$$

$\text{Bits}(BLK_{mv})$ represents a number of bits estimated to be required to code the input pixel block with reference to the reference block $BLK_{mv}$, $\text{DIST}(BLK_{mv})$ represents the distortion that would be obtained from coding the input pixel block with reference to the reference block $BLK_{mv}$, and k may be an operator-selected scalar to balance contribution of these factors. As explained, the method 700 may be performed to select a motion vector that minimizes the value J.

In an embodiment, the transforms may be performed to invert the distortions represented by equations (5) and (10).

The embodiment of FIG. 7 involves one transform of reference frame data for each candidate motion vector under consideration. In other embodiments, reference frame preprocessing may be performed, which may conserve processing resources.

Figure 8:
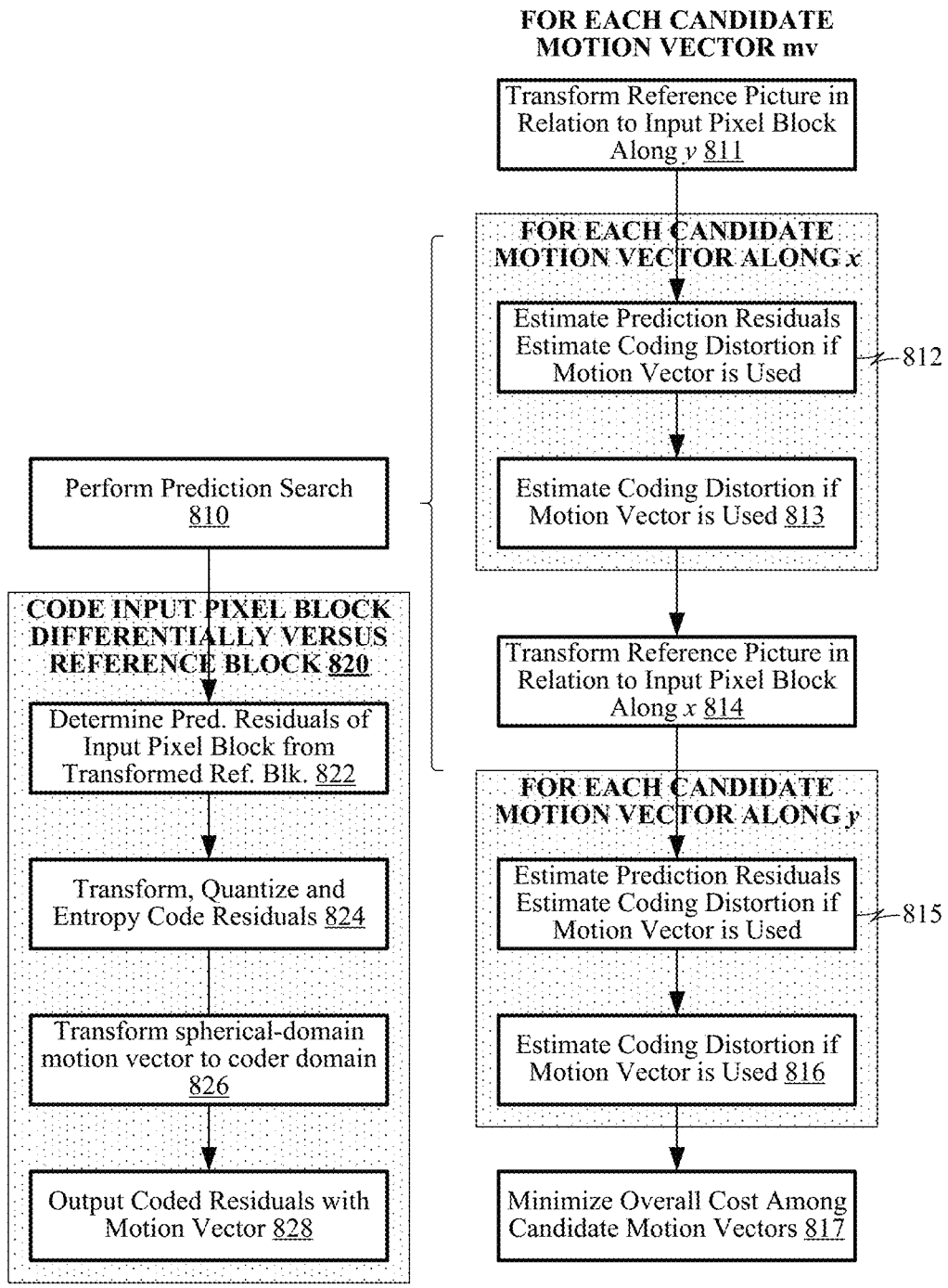
FIG. 8 illustrates a coding method according to an embodiment of the present disclosure.

FIG. 8 illustrates a coding method 800 according to an embodiment of the present disclosure. The method 800 may operate on a pixel-block by pixel-block basis to code a new input picture that is to be coded. The method 800 may perform a prediction search (box 810) from a comparison between an input pixel block data and reference picture data that is transformed to counter-act imaging distortion. When an appropriate prediction reference is found, the method 800 may code the input pixel block differentially using the transformed reference picture data (again, the "reference block," for convenience) as a basis for prediction (box 820). Typically, this differential coding includes a calculation of pixel residuals from a pixel-wise subtraction of prediction block data from the input pixel block data (box 822) and a transformation, quantization and entropy coding of the pixel residuals obtained therefrom (box 824). In this regard, the method 800 may adhere to coding protocols defined by a prevailing coding specification, such as ITU H.265 (also known as "HEVC"), H.264 (also, "AVC") or a predecessor coding specification. These specifications define protocols for defining pixel blocks, defining search windows for prediction references, and for performing differential coding of pixel blocks with reference to reference blocks. The method 800 also may transform spherical-domain representation of the motion vector to a coder-domain representation, the representation used by the video coding specification (box 826). The method 800 may output the coded pixel residuals, motion vectors and other metadata associated with prediction (typically, coding mode indicators and reference picture IDs) (box 828).

In an embodiment, the prediction search (box 810) may be performed to balance bandwidth conservation and information losses with processing resource costs. For each candidate motion vector mv, the method 800 first may transform the reference picture in relation to the input pixel block along a vertical direction y (box 811). This transform essentially transforms reference picture data within a search window of the prediction search based on its vertical displacement from the input pixel block being coded. Thereafter, the method 800, for each candidate x value of the search window, may estimate prediction residuals that would arise if the motion vector were used (box 812) and further may estimate the resulting distortion (box 813). Thereafter, the method 800 may transform the reference picture in relation to the input pixel block along a horizontal direction x (box 814). This transform essentially transforms reference picture data within a search window of the prediction search based on its horizontal displacement from the input pixel block being coded. The method 800, for each candidate y value of the search window, may estimate prediction residuals that would arise if the motion vector were used (box 815) and further may estimate the resulting distortion (box 816). Once estimates have been obtained for all candidate motion vectors under consideration, the method 800 may select the motion vector that minimizes overall coding cost (box 818).

As indicated, the transforms performed in boxes 811 and 814 essentially cause a transform that aligns reference image data with the input pixel blocks on a row-basis (box 811) and a column-basis (box 814). Results of these transforms may be re-used for coding of other input pixel blocks that also are aligned with the input pixel blocks on a row-basis or column-basis respectively. In other words, a system employing the method 800 of FIG. 8 may perform a single transform under box 811 to estimate coding cost and distortion for all input pixel blocks in a common row. Further, the system a system employing the method 800 of FIG. 8 may perform a single transform under box 814 to estimate coding cost and distortion for all input pixel blocks in a common column. Thus, the operation of method 800 is expected to conserve processing resources over operation of the method 700 of FIG. 7.

FIG. 9 illustrates transforms that may be applied to reference frame data according to the method 800 of FIG. 8. FIG. 9(a) illustrates relationships between an exemplary input pixel block $PB_{i,j}$ to be coded and reference frame data 900. The input pixel block $PB_{i,j}$ has a location i,j that defines a search window SW from which a coder may select reference frame data 900 to be used as a basis for prediction of the pixel block $PB_{i,j}$. During coding, the method 800 may test candidate motion vectors mv1, mv2, etc. within the search window SW to determine whether an adequate reference block may be found in the reference picture.

FIG. 9(b) illustrates exemplary transforms of the reference frame data that may be performed according to box 811. As illustrated, reference frame data may be transformed based on a vertical displacement between the pixel block $PB_{i,j}$ being coded and reference frame data. In the example illustrated in FIG. 9, the transformation essentially stretches reference frame content based on the vertical displacement. The degree of stretching increases as displacement from the input pixel block increases. The method may test candidate motion vectors within the stretched reference frame data 910 rather than the source reference frame data 900. As illustrated in FIG. 4, the stretched data of object Obj2 may provide a better source of prediction for object Obj1 than the source data of object Obj2.

In other use cases, image data need not be stretched. For example, during coding of image content of object Obj2 in FIG. 4, a reference frame may contain content of the object at a location corresponding to object Obj1. In this case, image data from the reference frame may be spatially condensed to provide an appropriate prediction match to the object Obj2. Thus, the type of stretching, whether expansion or contraction, may be determined based on the displacement between the pixel block $PB_{i,j}$ being coded and the reference frame data and also the location of the pixel block $PB_{i,j}$ being coded.

As illustrated in FIG. 9(b), the method 800 may perform a single transformation of reference frame data 910 that serves for prediction searches of all pixel blocks $PB_{0,j}$-$PB_{max,j}$ in a common row. Thus, method 800 of FIG. 8 is expected to conserve processing resources as compared to the method 700 of FIG. 7.

FIG. 9(c) illustrates exemplary transforms of the reference frame data that may be performed according to box 814. As illustrated, reference frame data 900 may be transformed based on a horizontal displacement between the pixel block $PB_{i,j}$ being coded and reference frame data. In the example illustrated in FIG. 9(c), the transformation essentially stretches reference frame content based on the horizontal displacement. The degree of stretching increases as displacement from the input pixel block increases. The method may test candidate motion vectors within the stretched reference frame data 920 rather than the source reference frame data 900.

Image data need not be stretched in all cases. As with the example of FIG. 9(b), the type of stretching, whether expansion or contraction, may be determined based on the displacement between the pixel block $PB_{i,j}$ being coded and the reference frame data and also the location of the pixel block $PB_{i,j}$ being coded.

As illustrated in FIG. 9(c), the method 800 may perform a single transformation of reference frame data 910 that serves for prediction searches of all pixel blocks $PB_{i,0}$-

$PB_{i,max}$ in a common row. Again, method 800 of FIG. 8 is expected to conserve processing resources as compared to the method 700 of FIG. 7.

Further resource conservation may be employed for the methods 700 and/or 800 by predicting whether motion vector-based coding will be performed. For example, based on ambient operating circumstances, it may be estimated that inter prediction will not be used, either for a given frame or for a portion of frame content. In such circumstances, the prediction searches 710 and/or 810 may be omitted. In another embodiment, ambient operating circumstances may indicate that there is a higher likelihood of motion along a row or along a column of input data. Such indications may be derived from motion sensor data provided by a device that provides image data or from frame-to-frame analyses of motion among image content. In such cases, the method 800 may be performed to omit operation of boxes 814-816 for row-based motion or to omit operation of boxes 811-813 for columnar motion. Alternatively, the method 800 may perform transforms along an estimated direction of motion, which need not be aligned to a row or column of image data (for example, a diagonal vector).

In other embodiments, a coder may select a sub-set of frame regions on which to perform transforms. For example, a coder may identify regions of content for which transforms are to be applied prior to each and other regions for which transforms need not be applied. Such regions may be selected, for example, based on analysis of frame content to identify objects in frame content that are likely to be regions of interest to viewers (for example, faces, bodies or other predetermined content). Such regions may be selected based on analysis of frame content that identifies foreground content within image data, which may be designated regions of interest. Further, such regions may be selected based on display activity reported by a display device 120 (FIG. 1); for example, if an encoder receives communication from a display 120 that indicates only a portion of the equirectangular image is being rendered on the display 120, the encoder may determine to apply such transforms on the portion being rendered and forego transform-based search on other regions that are not being rendered. In another embodiment, regions of particularly high motion may be designated for coding without such transforms; typically, coding losses in areas of high motion are not as perceptible to human viewers as coding losses in areas of low motion.

In a further embodiment, transforms may be performed to account for global camera motion. An encoder may receive data from a motion sensor 290 (FIG. 2) or perform image analysis that indicates a camera is moving during image capture. The image processor 220 may perform image transform operations on reference frames to align reference frame data spatially with the frames output by the camera system 210 (FIG. 2) during motion.

The principles of the present disclosure apply to prediction reference data that is utilized for intra-coding techniques, as well as inter-coding techniques. Where inter-coding exploits temporal redundancy in image data between frames, intra-coding exploits spatial redundancy within a single frame. Thus, an input pixel block may be coded with reference to previously-coded data of the same frame in which the input pixel block resides. Typically, video coders code an input frame on a pixel block-by-pixel block basis in a predetermined order, for example, a raster scan order. Thus, when coding an input pixel block at an intermediate point within a frame, an encoder will have coded image data of other pixel blocks that precede the input pixel block in coding order. Decoded data of the preceeding pixel blocks may be available to both the encoder and the decoder at the time the data of the intermediate pixel block is decoded and, thus, the preceding pixel blocks may be used as a prediction reference.

In such embodiments, prediction search operations for intra-coding may be performed between an input pixel block and prediction reference data (the previously coded pixel blocks of the same frame) that has been transformed according to Eqs. (5) and (10) according to the displacement between the input pixel block and candidate prediction blocks within the prediction reference data. Thus, the techniques of the present disclosure also find application for use in intra-coding.

Figure 10:
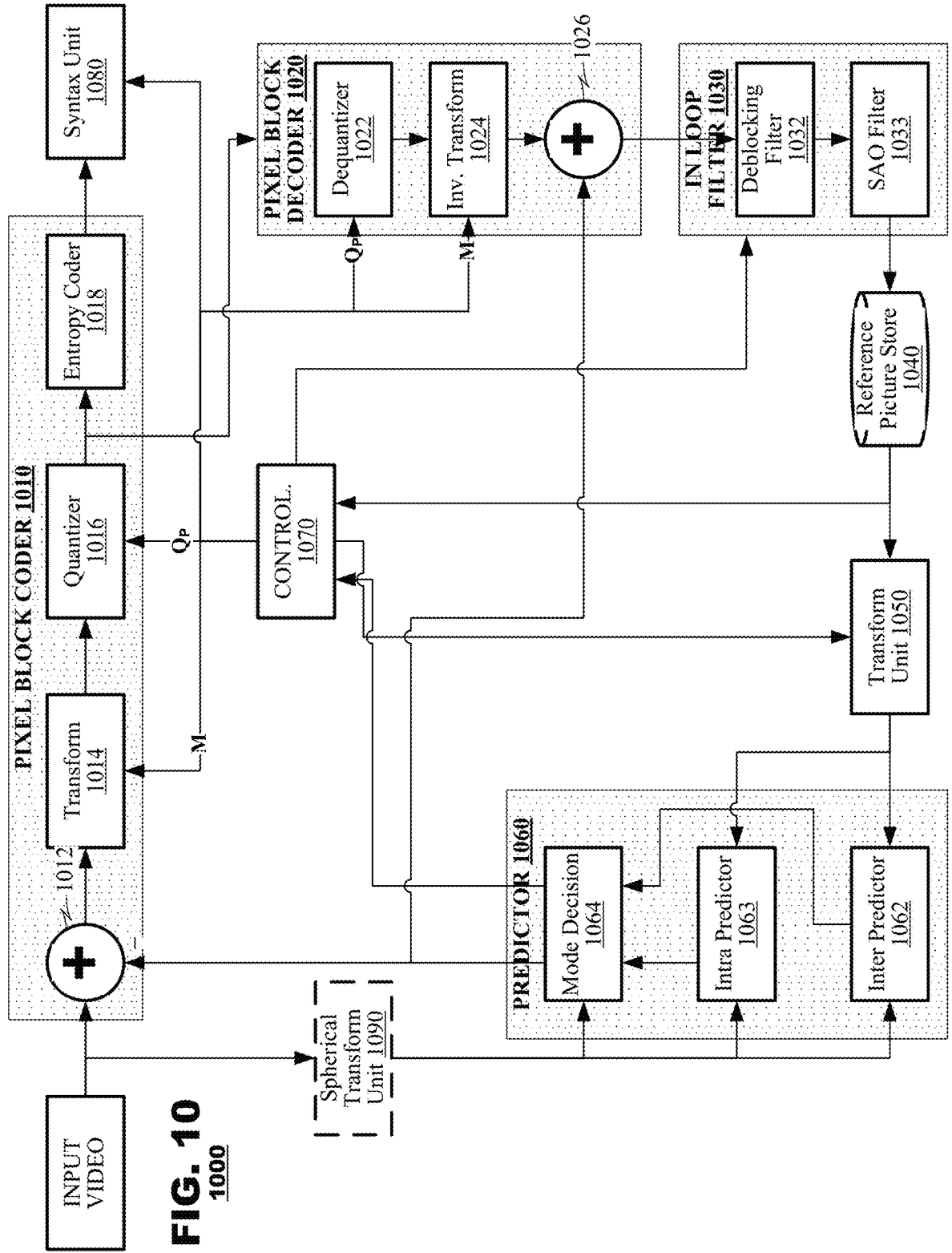
FIG. 10 is a functional block diagram of a coding system according to an embodiment of the present disclosure.

FIG. 10 is a functional block diagram of a coding system 1000 according to an embodiment of the present disclosure. The system 1000 may include a pixel block coder 1010, a pixel block decoder 1020, an in-loop filter system 1030, a reference picture store 1040, a transform unit 1050, a predictor 1060, a controller 1070, and a syntax unit 1080. The pixel block coder and decoder 1010, 1020 and the predictor 1060 may operate iteratively on individual pixel blocks of a picture. The predictor 1060 may predict data for use during coding of a newly-presented input pixel block. The pixel block coder 1010 may code the new pixel block by predictive coding techniques and present coded pixel block data to the syntax unit 1080. The pixel block decoder 1020 may decode the coded pixel block data, generating decoded pixel block data therefrom. The in-loop filter 1030 may perform various filtering operations on a decoded picture that is assembled from the decoded pixel blocks obtained by the pixel block decoder 1020. The filtered picture may be stored in the reference picture store 1040 where it may be used as a source of prediction of a later-received pixel block. The syntax unit 1080 may assemble a data stream from the coded pixel block data which conforms to a governing coding protocol.

The pixel block coder 1010 may include a subtractor 1012, a transform unit 1014, a quantizer 1016, and an entropy coder 1018. The pixel block coder 1010 may accept pixel blocks of input data at the subtractor 1012. The subtractor 1012 may receive predicted pixel blocks from the predictor 1060 and generate an array of pixel residuals therefrom representing a difference between the input pixel block and the predicted pixel block. The transform unit 1014 may apply a transform to the sample data output from the subtractor 1012, to convert data from the pixel domain to a domain of transform coefficients. The quantizer 1016 may perform quantization of transform coefficients output by the transform unit 1014. The quantizer 1016 may be a uniform or a non-uniform quantizer. The entropy coder 1018 may reduce bandwidth of the output of the coefficient quantizer by coding the output, for example, by variable length code words.

The transform unit 1014 may operate in a variety of transform modes as determined by the controller 1070. For example, the transform unit 1014 may apply a discrete cosine transform (DCT), a discrete sine transform (DST), a Walsh-Hadamard transform, a Haar transform, a Daubechies wavelet transform, or the like. In an embodiment, the controller 1070 may select a coding mode M to be applied by the transform unit 1015, may configure the transform unit 1015 accordingly and may signal the coding mode M in the coded video data, either expressly or impliedly.

The quantizer 1016 may operate according to a quantization parameter $Q_P$ that is supplied by the controller 1070. In an embodiment, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The pixel block decoder 1020 may invert coding operations of the pixel block coder 1010. For example, the pixel block decoder 1020 may include a dequantizer 1022, an inverse transform unit 1024, and an adder 1026. The pixel block decoder 1020 may take its input data from an output of the quantizer 1016. Although permissible, the pixel block decoder 1020 need not perform entropy decoding of entropy-coded data since entropy coding is a lossless event. The dequantizer 1022 may invert operations of the quantizer 1016 of the pixel block coder 1010. The dequantizer 1022 may perform uniform or non-uniform de-quantization as specified by the decoded signal $Q_P$. Similarly, the inverse transform unit 1024 may invert operations of the transform unit 1014. The dequantizer 1022 and the inverse transform unit 1024 may use the same quantization parameters $Q_P$ and transform mode M as their counterparts in the pixel block coder 1010. Quantization operations likely will truncate data in various respects and, therefore, data recovered by the dequantizer 1022 likely will possess coding errors when compared to the data presented to the quantizer 1016 in the pixel block coder 1010.

The adder 1026 may invert operations performed by the subtractor 1012. It may receive the same prediction pixel block from the predictor 1060 that the subtractor 1012 used in generating residual signals. The adder 1026 may add the prediction pixel block to reconstructed residual values output by the inverse transform unit 1024 and may output reconstructed pixel block data.

The in-loop filter 1030 may perform various filtering operations on recovered pixel block data. For example, the in-loop filter 1030 may include a deblocking filter 1032 and a sample adaptive offset ("SAO") filter 1033. The deblocking filter 1032 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The in-loop filter 1030 may operate according to parameters that are selected by the controller 1070.

The reference picture store 1040 may store filtered pixel data for use in later prediction of other pixel blocks. Different types of prediction data are made available to the predictor 1060 for different prediction modes. For example, for an input pixel block, intra prediction takes a prediction reference from decoded data of the same picture in which the input pixel block is located. Thus, the reference picture store 1040 may store decoded pixel block data of each picture as it is coded. For the same input pixel block, inter prediction may take a prediction reference from previously coded and decoded picture(s) that are designated as reference pictures. Thus, the reference picture store 1040 may store these decoded reference pictures.

The transform unit 1050 may perform transforms of reference picture data as discussed in the foregoing embodiments. Thus, based on displacement between an input pixel block and reference picture data in a search window about the input pixel block, the transform unit 1050 may generate transformed reference picture data. The transform unit 1050 may output the transformed reference picture data to the predictor 1060.

As discussed, the predictor 1060 may supply prediction data to the pixel block coder 1010 for use in generating residuals. The predictor 1060 may include an inter predictor 1062, an intra predictor 1063 and a mode decision unit 1064. The inter predictor 1062 may receive spherically-projected pixel block data representing a new pixel block to be coded and may search spherical projections of reference picture data from store 1040 for pixel block data from reference picture(s) for use in coding the input pixel block. The inter predictor 1062 may support a plurality of prediction modes, such as P mode coding and B mode coding. The inter predictor 1062 may select an inter prediction mode and an identification of candidate prediction reference data that provides a closest match to the input pixel block being coded. The inter predictor 1062 may generate prediction reference metadata, such as motion vectors, to identify which portion(s) of which reference pictures were selected as source(s) of prediction for the input pixel block.

The intra predictor 1063 may support Intra (I) mode coding. The intra predictor 1063 may search from among spherically-projected pixel block data from the same picture as the pixel block being coded that provides a closest match to the spherically-projected input pixel block. The intra predictor 1063 also may generate prediction reference indicators to identify which portion of the picture was selected as a source of prediction for the input pixel block.

The mode decision unit 1064 may select a final coding mode to be applied to the input pixel block. Typically, as described above, the mode decision unit 1064 selects the prediction mode that will achieve the lowest distortion when video is decoded given a target bitrate. Exceptions may arise when coding modes are selected to satisfy other policies to which the coding system 1000 adheres, such as satisfying a particular channel behavior, or supporting random access or data refresh policies. When the mode decision selects the final coding mode, the mode decision unit 1064 may output a non-spherically-projected reference block from the store 1040 to the pixel block coder and decoder 1010, 1020 and may supply to the controller 1070 an identification of the selected prediction mode along with the prediction reference indicators corresponding to the selected mode.

The controller 1070 may control overall operation of the coding system 1000. The controller 1070 may select operational parameters for the pixel block coder 1010 and the predictor 1060 based on analyses of input pixel blocks and also external constraints, such as coding bitrate targets and other operational parameters. As is relevant to the present discussion, when it selects quantization parameters $Q_P$, the use of uniform or non-uniform quantizers, and/or the transform mode M, it may provide those parameters to the syntax unit 1080, which may include data representing those parameters in the data stream of coded video data output by the system 1000.

During operation, the controller 1070 may revise operational parameters of the quantizer 1016 and the transform unit 1015 at different granularities of image data, either on a per pixel block basis or on a larger granularity (for example, per picture, per slice, per largest coding unit ("LCU") or another region). In an embodiment, the quantization parameters may be revised on a per-pixel basis within a coded picture.

Additionally, as discussed, the controller 1070 may control operation of the in-loop filter 1030 and the prediction unit 1060. Such control may include, for the prediction unit 1060, mode selection (lambda, modes to be tested, search windows, distortion strategies, etc.), and, for the in-loop filter 1030, selection of filter parameters, reordering parameters, weighted prediction, etc.

In an embodiment, the predictor 1060 may perform prediction searches using input pixel block data and reference pixel block data in a spherical projection. Operation of such prediction techniques are described in U.S. patent application Ser. No. 15/390,202, filed Dec. 23, 2016 and assigned to the assignee of the present application. In such an embodiment, the coder 1000 may include a spherical transform unit 1090 that transforms input pixel block data to a spherical domain prior to being input to the predictor 1060. The transform unit 1050 may transform reference picture data to the spherical domain (in addition to performing the transforms described hereinabove) prior to being input to the predictor 1060.

Figure 11:
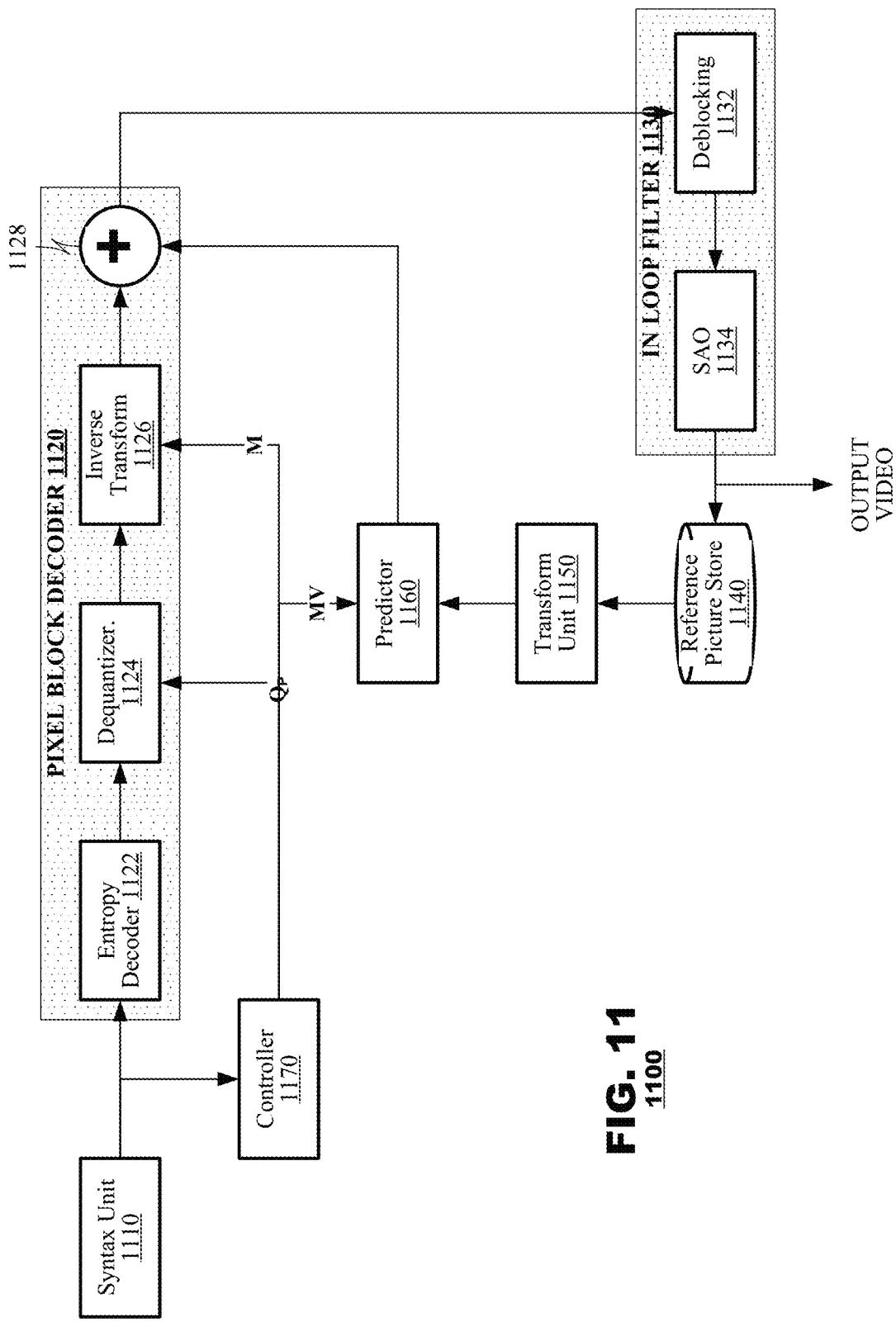
FIG. 11 is a functional block diagram of a decoding system according to an embodiment of the present disclosure.

FIG. 11 is a functional block diagram of a decoding system 1100 according to an embodiment of the present disclosure. The decoding system 1100 may include a syntax unit 1110, a pixel block decoder 1120, an in-loop filter 1130, a reference picture store 1140, a transform unit 1150, a predictor 1160, and a controller 1170. The syntax unit 1110 may receive a coded video data stream and may parse the coded data into its constituent parts. Data representing coding parameters may be furnished to the controller 1170 while data representing coded residuals (the data output by the pixel block coder 1010 of FIG. 10) may be furnished to the pixel block decoder 1120. The pixel block decoder 1120 may invert coding operations provided by the pixel block coder 1010 (FIG. 10). The in-loop filter 1130 may filter reconstructed pixel block data. The reconstructed pixel block data may be assembled into pictures for display and output from the decoding system 1100 as output video. The pictures also may be stored in the prediction buffer 1140 for use in prediction operations. The transform unit 1150 may perform transforms of reference picture data identified by motion vectors contained in the coded pixel block data as described in the foregoing discussion. The predictor 1160 may supply prediction data to the pixel block decoder 1120 as determined by coding data received in the coded video data stream.

The pixel block decoder 1120 may include an entropy decoder 1122, a dequantizer 1124, an inverse transform unit 1126, and an adder 1128. The entropy decoder 1122 may perform entropy decoding to invert processes performed by the entropy coder 1018 (FIG. 10). The dequantizer 1124 may invert operations of the quantizer 1016 of the pixel block coder 1010 (FIG. 10). Similarly, the inverse transform unit 1126 may invert operations of the transform unit 1014 (FIG. 10). They may use the quantization parameters $Q_P$ and transform modes M that are provided in the coded video data stream. Because quantization is likely to truncate data, the data recovered by the dequantizer 1124, likely will possess coding errors when compared to the input data presented to its counterpart quantizer 1016 in the pixel block coder 1010 (FIG. 10).

The adder 1128 may invert operations performed by the subtractor 1011 (FIG. 10). It may receive a prediction pixel block from the predictor 1160 as determined by prediction references in the coded video data stream. The adder 1128 may add the prediction pixel block to reconstructed residual values output by the inverse transform unit 1126 and may output reconstructed pixel block data.

The in-loop filter 1130 may perform various filtering operations on reconstructed pixel block data. As illustrated, the in-loop filter 1130 may include a deblocking filter 1132 and an SAO filter 1134. The deblocking filter 1132 may filter data at seams between reconstructed pixel blocks to reduce discontinuities between the pixel blocks that arise due to coding. SAO filters 1134 may add offset to pixel values according to an SAO type, for example, based on edge direction/shape and/or pixel level. Other types of in-loop filters may also be used in a similar manner. Operation of the deblocking filter 1132 and the SAO filter 1134 ideally would mimic operation of their counterparts in the coding system 1000 (FIG. 10). Thus, in the absence of transmission errors or other abnormalities, the decoded picture obtained from the in-loop filter 1130 of the decoding system 1100 would be the same as the decoded picture obtained from the in-loop filter 1030 of the coding system 1000 (FIG. 10); in this manner, the coding system 1000 and the decoding system 1100 should store a common set of reference pictures in their respective reference picture stores 1040, 1140.

The reference picture stores 1140 may store filtered pixel data for use in later prediction of other pixel blocks. The reference picture stores 1140 may store decoded pixel block data of each picture as it is coded for use in intra prediction. The reference picture stores 1140 also may store decoded reference pictures.

The transform unit 1150 may perform transforms of reference picture data as discussed in the foregoing embodiments. In a decoder 1100, it is sufficient for the transform unit 1150 to perform transforms of reference picture identified by motion vectors contained in the coded video data. The motion vector may identify to the decoder 1100 the location within the reference picture from which the encoder 1000 (FIG. 10) derived a reference block. The decoder's transform unit 1150 may perform the same transformation of reference picture data, using the motion vector and based on a the pixel block being decoded and the reference block, to generate transformed reference block data.

As discussed, the predictor 1160 may supply the transformed reference block data to the pixel block decoder 1120. The predictor 1160 may supply predicted pixel block data as determined by the prediction reference indicators supplied in the coded video data stream.

The controller 1170 may control overall operation of the coding system 1100. The controller 1170 may set operational parameters for the pixel block decoder 1120 and the predictor 1160 based on parameters received in the coded video data stream. As is relevant to the present discussion, these operational parameters may include quantization parameters $Q_P$ for the dequantizer 1124 and transform modes M for the inverse transform unit 1115. As discussed, the received parameters may be set at various granularities of image data, for example, on a per pixel block basis, a per picture basis, a per slice basis, a per LCU basis, or based on other types of regions defined for the input image.

In practice, encoders and decoders may exchange signaling to identify parameters of the coding operations that are performed. The signaling typically is performed with reference to a coding protocol, such as HEVC, AVC and related protocols, that define syntax elements for communication of such parameter. In an embodiment, the techniques of the foregoing embodiments may be integrated with the HEVC coding protocol that adds a new parameter, called "reference_correction_id" to a sequence parameter dataset, such as by:

| | Descriptor |
|---|---|
| seq_parameter_set_rbsp( ) ; | |
|   sps_video_parameter_set_id | u(4) |
|   sps_max_sub_layers_minus1 | u(3) |
|   sps_temporal_id_nesting_flag | u(1) |
|   profile_tier_level(1, sps_max_sub_layers_minus1) | |

| | Descriptor |
|---|---|
| sps_seq_paramter_set_id | ue(v) |
| reference_correction_id | u(3) |
| chroma_format_idc | ue(v) |

In an embodiment, the reference_correction_id may take values such as:

| reference_correction_id | format |
|---|---|
| 0 | Nothing done |
| 1 | Horizontal |
| 2 | Vertical |
| 3 | Horizontal and vertical |
| 4 | Vertical and horizontal |
| 5 | Transform |
| 6 | Reserved |
| 7 | Reserved | where:

reference_correction_id=0 indicates no special handling is performed, reference_correction_id=1 indicates only horizontal distortion correction is performed;

reference_correction_id=2 indicates only vertical distortion correction is performed;

reference_correction_id=3 indicates that horizontal distortion correction is performed first, followed by vertical correction for each block in a different row.

reference_correction_id=4 indicates that vertical distortion correction is performed first, followed by horizontal correction for each block in a different column.

reference_correction_id=5 indicates that block by block transforms are applied for each reference candidate during prediction searches.

Of course, the coding parameters may be signaled according to a different syntax as may be desired.

The foregoing discussion has described operation of the embodiments of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic- and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Figure 12:
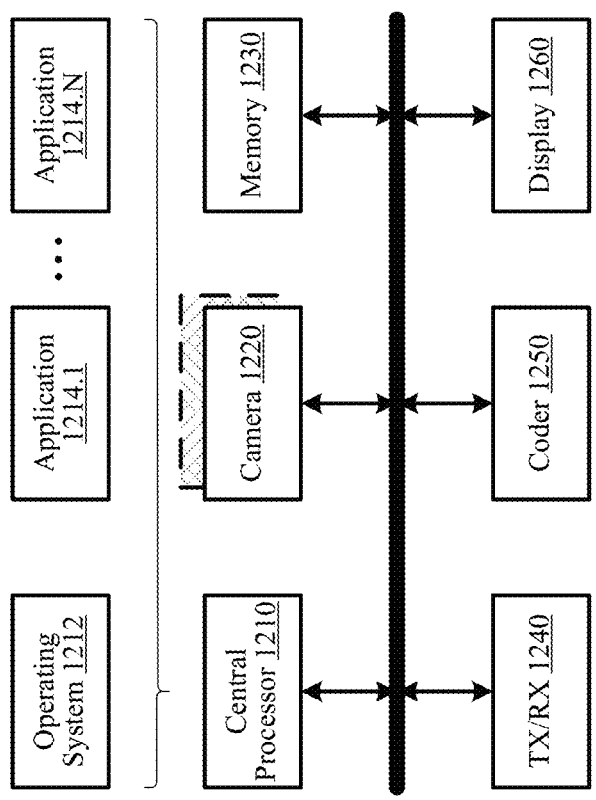
FIG. 12 illustrates an computer system suitable for use with embodiments of the present disclosure.

For example, the techniques described herein may be performed by a central processor of a computer system. FIG. 12 illustrates an exemplary computer system 1200 that may perform such techniques. The computer system 1200 may include a central processor 1210, one or more cameras 1220, a memory 1230, and a transceiver 1240 provided in communication with one another. The camera 1220 may perform image capture and may store captured image data in the memory 1230. Optionally, the device also may include sink components, such as a coder 1250 and a display 1260, as desired.

The central processor 1210 may read and execute various program instructions stored in the memory 1230 that define an operating system 1212 of the system 1200 and various applications 1214.1-1214.N. The program instructions may perform coding mode control according to the techniques described herein. As it executes those program instructions, the central processor 1210 may read, from the memory 1230, image data created either by the camera 1220 or the applications 1214.1-1214.N, which may be coded for transmission. The central processor 1210 may execute a program that operates according to the principles of FIG. 6. Alternatively, the system 1200 may have a dedicated coder 1250 provided as a standalone processing system and/or integrated circuit.

As indicated, the memory 1230 may store program instructions that, when executed, cause the processor to perform the techniques described hereinabove. The memory 1230 may store the program instructions on electrical-, magnetic- and/or optically-based storage media.

The transceiver 1240 may represent a communication system to transmit transmission units and receive acknowledgement messages from a network (not shown). In an embodiment where the central processor 1210 operates a software-based video coder, the transceiver 1240 may place data representing state of acknowledgment message in memory 1230 to retrieval by the processor 1210. In an embodiment where the system 1200 has a dedicated coder, the transceiver 1240 may exchange state information with the coder 1250.

The foregoing description has been presented for purposes of illustration and description. It is not exhaustive and does not limit embodiments of the disclosure to the precise forms disclosed. Modifications and variations are possible in light of the above teachings or may be acquired from the practicing embodiments consistent with the disclosure. Unless described otherwise herein, any of the methods may be practiced in any combination.

We claim:

1. A method for coding an input pixel block containing multi-directional image content, comprising:

for a spherical domain transform based on a first direction within a reference picture having an equiangular format,
transforming content of the reference picture within a search window by a spherical-domain transform of content elements within the search window, wherein each of the content elements is transformed according to a displacement along the first direction between a location of the input pixel block and a location of the content elements within the search window,
performing a prediction search along a perpendicular to the first direction upon which the spherical domain transform is based and within the spherical-domain transformed content of the reference picture to identify a match between the input pixel block and a matching portion of the transformed content of the reference picture; and
when a match is identified, coding the input pixel block differentially with respect to the matching portion.

2. The method of claim 1, wherein the transforming comprises, for each candidate motion vector in the search window, transforming a reference block that is identified from the reference picture by the candidate motion vector.

3. The method of claim 1, wherein for a row of pixel blocks along the first direction and including the input pixel block, the transforming comprises, transforming, vertically along columns perpendicular to the first direction, content of the reference picture within a search window about the row of pixel blocks, and wherein the transformed content of the reference picture is used for prediction searches of the other pixel blocks in the row.

4. The method of claim 1, wherein for a column of pixel blocks including the input pixel block, the transforming comprises, transforming, horizontally along rows, content of the reference picture within a search window about the column of pixel blocks, and wherein the transformed content of the reference picture is used for prediction searches of the other pixel blocks in the column.

5. The method of claim 1, wherein the transforming comprises, transforming content of the reference picture within a search window along a direction of motion identified for a frame that includes the input pixel block.

6. The method of claim 1, wherein the coding is intra-coding and the reference picture includes decoded data of previously-coded data of a same frame in which the input pixel block is located.

7. The method of claim 1, wherein the coding is inter-coding and the reference picture includes decoded data of another frame that was coded prior to coding of a frame in which the input pixel block is located.

8. The method of claim 1, wherein the multi-directional image content is generated by a multi-view camera having fish eye lenses.

9. The method of claim 1, wherein the multi-directional image content is generated by an omnidirectional camera.

10. The method of claim 1, wherein the multi-directional image content is generated by a computer application.

11. The method of claim 1, wherein the coding comprises:
calculating prediction residuals representing differences between pixels of the input pixel block and the matching portion of the transformed reference picture,
transforming the prediction residuals to transform coefficients,
quantizing the transform coefficients, and
entropy coding the quantized coefficients.

12. The method of claim 1, further comprising transmitting with coded data of the input pixel block, a parameter identifying a type of transform performed on the reference picture.

13. The method of claim 1, further comprising:
coding a plurality of input pixel blocks by, respectively:
estimating a prediction mode to be applied to each respective pixel block, and
when the estimated prediction mode is an inter-coding mode, performing the transforming, prediction search and coding for the respective pixel block, and
when the estimated prediction mode is an intra-coding mode, omitting the transforming, prediction search and coding for the respective pixel block.

14. The method of claim 1, further comprising:
estimating global motion of a frame to which the input pixel block belongs,
wherein the transforming comprises aligning the reference picture spatially with respect to the input pixel block's frame.

15. The method of claim 1 wherein content elements at different displacements from the input pixel block are subject to different transforms.

16. The method of claim 1 wherein:
the search window is larger than the input pixel block along the first direction, and
the prediction search in the search window includes searching along both the first direction and along the direction perpendicular to the first direction.

17. A non-transitory computer readable storage medium having stored thereon program instructions that, when executed by a processing device, cause the device to:
for a spherical domain transform based on a first direction within a reference picture having an equiangular format,
transforming content of the reference picture within a search window by a spherical-domain transform of content elements within the search window, wherein each of the content elements is transformed according to a displacement along the first direction between a location of the input pixel block and a location of the content elements within the search window,
performing a prediction search along a perpendicular to the first direction upon which the spherical domain transform is based and within the spherical-domain transformed content of the reference picture to identify a match between the input pixel block and a matching portion of the transformed content of the reference picture; and
when a match is identified, coding the input pixel block differentially with respect to the matching portion.

18. The medium of claim 17, wherein the transform comprises, for each candidate motion vector in the search window, transforming a reference block that is identified from the reference picture by the candidate motion vector.

19. The medium of claim 17, wherein for a row of pixel blocks including the input pixel block, the transform comprises, transforming, vertically along columns, content of the reference picture within a search window about the row of pixel blocks, and wherein the transformed content of the reference picture is used for prediction searches of the other pixel blocks in the row.

20. The medium of claim 17, wherein for a column of pixel blocks including the input pixel block, the transform comprises, transforming, horizontally along rows, content of the reference picture within a search window about the column of pixel blocks, and wherein the transformed content of the reference picture is used for prediction searches of the other pixel blocks in the column.

21. The medium of claim 17, wherein the multi-directional image content is generated by a multi-directional camera having fish eye lenses.

22. The medium of claim 17, wherein the multi-directional image content is generated by an omnidirectional camera.

23. The medium of claim 17, wherein the multi-directional image content is generated by a computer application.

24. The medium of claim 17, wherein the coding comprises:
calculating prediction residuals representing differences between pixels of the input pixel block and the matching portion of the transformed reference picture,
transforming the prediction residuals to transform coefficients,
quantizing the transform coefficients, and
entropy coding the quantized coefficients.

25. The medium of claim 17, wherein the program instructions cause the device to transmit with coded data of the input pixel block, a parameter identifying a type of transform performed on the reference picture.

26. A video coder, comprising:
    a pixel block coder,
    a pixel block decoder having an input coupled to an output of the pixel block coder,
    a reference picture store to store reference pictures in an equiangular format based on a first direction from pixel blocks output from the pixel block decoder,
    a transform unit transforming reference picture content from the reference picture store within a search window about a location of an input pixel block, wherein the transforming is by a spherical-domain transform based on the first direction of the equiangular format and which transforms content elements within the search window, wherein each of the content elements is transformed according to a displacement along the first direction of the equiangular format between the location of the input pixel block and a location of the content element within the search window, and
    a motion predictor for predicting the input pixel block by searching along a perpendicular to the first direction upon which the spherical-domain transform is based within the spherical-domain transformed content of the reference picture.

27. The coder of claim 26, wherein, for each candidate motion vector in the search window, the transform unit transforms a reference block that is identified from the reference picture by the candidate motion vector.

28. The coder of claim 26, wherein for a row of pixel blocks including the input pixel block, the transform unit transforms, vertically along columns, content of the reference picture within a search window about the row of pixel blocks, and wherein the motion predictor uses the transformed content of the reference picture used for prediction searches of the other pixel blocks in the row.

29. The coder of claim 26, wherein for a column of pixel blocks including the input pixel block, the transform unit transforms, horizontally along rows, content of the reference picture within a search window about the column of pixel blocks, and wherein the motion predictor uses the transformed content of the reference picture used for prediction searches of the other pixel blocks in the column.

30. A method of decoding a coded pixel block, comprising:
    from a reference picture having an equiangular format based on a first direction, transforming a reference block, identified by a motion vector provided in data of the coded pixel block, the transforming is by a spherical-domain transform based on the first direction of the equirectangular format, wherein the reference block is transformed based on a displacement along the first direction between a location of the coded pixel block and a location of the reference block and wherein the motion vector indicates the result of a search along a perpendicular to the first direction upon which the spherical-domain transform is based,
    decoding the input pixel block differentially with respect to the transformed reference block using other data of the coded pixel block.

31. The medium of claim 30, the transforming is performed according to a type of transform identified in the other data of the coded pixel block.

32. A method for coding an input pixel block containing multi-directional image content, comprising:
    transforming content of the input pixel block from an equirectangular source domain to a spherical domain by a spherical transform based on a first axis of the equirectangular source domain;
    for a plurality of stored reference pictures, transforming content of the reference picture(s) within a search window located about a location of the input pixel block from the source domain to the spherical domain, wherein the transforming is based on a location of the input pixel block and based on a distance along the first axis of content elements within the search window from the location of the input pixel block,
    performing a prediction search along a second axis perpendicular to the first axis of the equirectangular source domain to identify a match between the transformed spherical domain input pixel block and a matching portion of one of the transformed spherical domain reference pictures, and
    coding the source domain input pixel block differentially with respect to matching content from a source domain reference picture corresponding to the one transformed spherical domain reference picture, the matching content identified by the prediction search conducted in the spherical domain.

* * * * *